United States Patent
Kitagawa et al.

(10) Patent No.: US 10,634,081 B2
(45) Date of Patent: Apr. 28, 2020

(54) CONTROL DEVICE OF INTERNAL COMBUSTION ENGINE

(71) Applicant: TOYOTA JIDOSHA KABUSHIKI KAISHA, Toyota-shi (JP)

(72) Inventors: Eiki Kitagawa, Susono (JP); Masato Ehara, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 114 days.

(21) Appl. No.: 15/922,151

(22) Filed: Mar. 15, 2018

(65) Prior Publication Data

US 2019/0242318 A1    Aug. 8, 2019

(30) Foreign Application Priority Data

Feb. 5, 2018 (JP) .................................. 2018-01845

(51) Int. Cl.
    *F02D 41/14*    (2006.01)
    *G06N 20/00*    (2019.01)
    *G06N 3/08*     (2006.01)

(52) U.S. Cl.
    CPC ......... *F02D 41/1405* (2013.01); *G06N 3/084* (2013.01); *G06N 20/00* (2019.01); *F02D 41/1461* (2013.01); *F02D 2200/0404* (2013.01); *F02D 2200/0414* (2013.01); *F02D 2200/0806* (2013.01); *F02D 2200/101* (2013.01)

(58) Field of Classification Search
    CPC ........... F02D 41/1405; F02D 2200/101; F02D 2200/0806; F02D 2200/0414; F02D 2200/0404; G06N 3/084; G06N 20/00

USPC ....................................... 701/106; 706/15–44
    See application file for complete search history.

(56) References Cited

U.S. PATENT DOCUMENTS

| 5,033,006 A | 7/1991 | Ishizuka et al. |
| 5,093,899 A | 3/1992 | Hiraiwa |
| 5,129,039 A | 7/1992 | Hiraiwa |
| 5,247,445 A * | 9/1993 | Miyano ............... F02D 41/1405 123/488 |
| 5,625,750 A * | 4/1997 | Puskorius ............... F01N 11/00 123/672 |

(Continued)

FOREIGN PATENT DOCUMENTS

| JP | 2-83656 A | 3/1990 |
| JP | 2-238560 A | 9/1990 |

(Continued)

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A control device of an internal combustion engine using a neural network. When a value of an operating parameter of the engine is outside a preset range, the number of nodes of a hidden layer one layer before an output layer of the neural network is increased and training data obtained by actual measurement with respect to a newly acquired value of an operating parameter of the engine is used to learn a weight of the neural network so that a difference between the output value changing corresponding to the value of the operating parameter of the engine and training data corresponding to the value of the operating parameter of the engine becomes smaller.

11 Claims, 15 Drawing Sheets

(56) References Cited

U.S. PATENT DOCUMENTS

| | | | | |
|---|---|---|---|---|
| 5,627,941 A | * | 5/1997 | Takahashi | G06N 3/08 706/25 |
| 5,719,480 A | * | 2/1998 | Bock | B25J 9/163 318/561 |
| 5,781,700 A | * | 7/1998 | Puskorius | F02D 41/1405 706/14 |
| 5,904,227 A | * | 5/1999 | Whitehall | B66B 1/2408 187/380 |
| 5,915,368 A | * | 6/1999 | Ishida | F02D 41/047 123/675 |
| 6,084,981 A | * | 7/2000 | Horiba | G06K 9/40 382/157 |
| 6,098,012 A | * | 8/2000 | Stander | F02D 37/02 123/406.47 |
| 6,269,351 B1 | * | 7/2001 | Black | G06F 16/30 706/15 |
| 6,466,924 B1 | * | 10/2002 | Tateishi | G06N 3/02 706/15 |
| 6,601,051 B1 | * | 7/2003 | Lo | H03H 21/0012 706/23 |
| 7,483,868 B2 | * | 1/2009 | Meng | G06N 3/082 706/26 |
| 8,862,527 B2 | * | 10/2014 | Garner | G06N 3/088 706/25 |
| 2005/0033709 A1 | * | 2/2005 | Meng | G06N 3/08 706/25 |
| 2006/0208169 A1 | * | 9/2006 | Breed | B60N 2/002 250/221 |
| 2007/0185825 A1 | | 8/2007 | Ito et al. | |
| 2008/0154811 A1 | * | 6/2008 | Grichnik | G06N 3/084 706/13 |
| 2009/0326348 A1 | * | 12/2009 | Baker, Jr. | A61B 5/14551 600/323 |
| 2010/0050025 A1 | * | 2/2010 | Grichnik | G05B 17/02 714/47.2 |
| 2013/0304679 A1 | * | 11/2013 | Fleming | G05B 13/027 706/14 |
| 2015/0371149 A1 | | 12/2015 | Iso | |
| 2017/0177993 A1 | * | 6/2017 | Draelos | G06N 3/0454 |

FOREIGN PATENT DOCUMENTS

| | | | |
|---|---|---|---|
| JP | H1025257 A | * | 3/1997 |
| JP | 10252537 A | * | 9/1998 |
| JP | 11-82137 A | | 3/1999 |
| JP | 2007-299366 A | | 11/2007 |
| JP | 2012-014617 A | * | 1/2012 |
| JP | 10252537 A | * | 1/2012 |
| JP | 2012-112277 | | 6/2012 |
| JP | 2016-4547 A | | 1/2016 |

* cited by examiner

L=1    L=2    L=3

CONTROL DEVICE OF INTERNAL COMBUSTION ENGINE

TECHNICAL FIELD

The present invention relates to a control device of an internal combustion engine.

BACKGROUND ART

In control devices of internal combustion engines using neural networks, there is known a control device of an internal combustion engine designed to learn in advance the weight of a neural network based on values of an engine speed, amount of intake air, and other operating parameters of the engine so that an amount of gas sucked into a combustion chamber matches an actual amount of gas sucked into the combustion chamber and to use the neural network with the learned weight at the time of engine operation so as to estimate the amount of gas sucked into the combustion chamber from the values of the operating parameters of the engine (for example, see Japanese Patent Publication No. 2012-112277A).

SUMMARY OF INVENTION

Technical Problem

In this regard, the usable ranges of the values of the operating parameters of an engine, such as the engine speed, can be presumed in advance according to the type of the engine, therefore the weight of the neural network is learned in advance so that usually, in the usable ranges of the values of the operating parameters of the engine presumed in advance, the difference between an output value of the neural network and an actual value, such as the actual amount of gas sucked into a combustion chamber, becomes smaller.

However, in actuality, the values of operating parameters of an engine sometimes deviate from the presumed usable ranges. In such a case, since learning based on actual values is not conducted for values outside the presumed usable ranges, there is the problem that an output value calculated using the neural network will be a value greatly deviating from the actual value.

To solve this problem, according to the present invention, there is provided a control device of an internal combustion engine having an electronic control unit, the electronic control unit comprises:

a parameter value acquiring part for acquiring values of operating parameters of the engine, a processing part for performing processing using a neural network comprised of an input layer, hidden layer, and output layer, and a storage part, the values of the operating parameters of the engine being input to the input layer, and an output value which changes in accordance with the values of the operating parameters of the engine being output from the output layer, wherein ranges of the values of the operating parameters of the engine are set in advance, the number of neural networks and the number of nodes of a hidden layer of a neural network corresponding to the ranges of values of the operating parameters of the engine are set in advance, training data obtained by actually measuring values of the operating parameters of the engine in the preset ranges is stored in the storage part, when a value of an operating parameter of the engine newly acquired by the parameter value acquiring part is in the preset range, the training data stored in the storage part is used by the processing part to learn the weight of the neural network so that the difference between the output value changing according to the value of that operating parameters of the engine and the training data corresponding to the value of that operating parameter of the engine becomes smaller, when a value of an operating parameter of the engine newly acquired by the parameter value acquiring part is outside the preset range, the number of nodes of the hidden layer one layer before the output layer of the neural network is made to increase corresponding to the number or data density of the training data obtained by actual measurement with respect to the newly acquired value of the operating parameters of the engine, the training data obtained by actual measurement with respect to the newly acquired value of the operating parameter of the engine is used by the processing part to learn the weight of the neural network so that the difference between the output value changing according to the value of the operating parameter of the engine and the training data corresponding to the value of the operating parameter of the engine becomes smaller, and the neural network with the learned weight is used to output an output value corresponding to the value of that operating parameter of the engine.

Advantageous Effects of Invention

By increasing the number of nodes of a hidden layer of the neural network in accordance with the number or data density of the training data obtained by actual measurement with respect to a newly acquired value of the operating parameter of the engine when the newly acquired value of an operating parameter of an engine is outside the presumed range, it is possible to keep the output value computed using the neural network from becoming a value greatly deviating from the actual value when a value of an operating parameter of the engine becomes a value outside the presumed range.

DESCRIPTION OF EMBODIMENTS

Overall Configuration of Internal Combustion Engine

Figure 1:
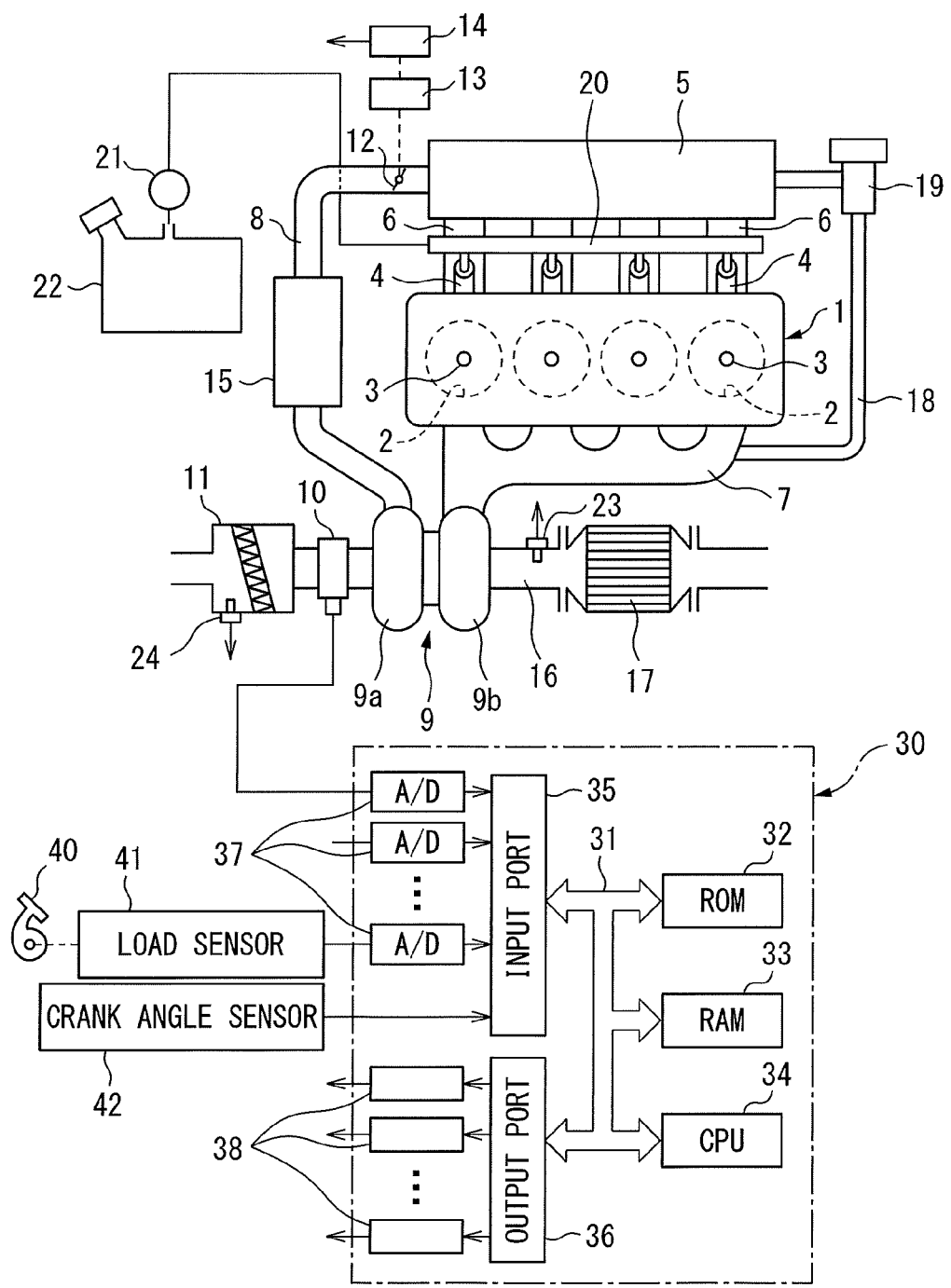
FIG. 1 is an overall view of an internal combustion engine.

FIG. 1 shows the overall configuration of an internal combustion engine. Referring to FIG. 1, 1 shows an engine body, 2 combustion chambers of the cylinders, 3 spark plugs arranged in the combustion chambers 2 of the cylinders, 4 fuel injectors for injecting fuel, for example, gasoline, to the cylinders, 5 a surge tank, 6 intake branch pipes, and 7 an exhaust manifold. The surge tank 5 is connected through an intake duct 8 to the outlet of a compressor 9a of an exhaust turbocharger 9, while the inlet of the compressor 9a is connected through an intake air amount detector 10 to an air cleaner 11. Inside the intake duct 8, a throttle valve 12 driven by an actuator 13 is arranged. At the throttle valve 12, a throttle valve opening degree sensor 14 for detecting the throttle valve opening degree is attached. Further, around the intake duct 8, an intercooler 15 is arranged for cooling the intake air flowing through the inside of the intake duct 8.

On the other hand, the exhaust manifold 7 is connected to the inlet of the exhaust turbine 9b of the exhaust turbocharger 9, while the outlet of the exhaust turbine 9b is connected through an exhaust pipe 16 to an exhaust purification use catalytic converter 17. The exhaust manifold 7 and the surge tank 5 are connected with each other through an exhaust gas recirculation (below, referred to as "EGR") passage 18. Inside the EGR passage 18, an EGR control valve 19 is arranged. Each fuel injector 4 is connected to a fuel distribution pipe 20. This fuel distribution pipe 20 is connected through a fuel pump 21 to a fuel tank 22. Inside the exhaust pipe 16, an $NO_X$ sensor 23 is arranged for detecting the concentration of $NO_X$ in the exhaust gas. Further, inside the air cleaner 11, an atmospheric temperature sensor 24 is arranged for detecting the atmospheric temperature.

An electronic control unit 30 is comprised of a digital computer provided with a ROM (read only memory) 32, RAM (random access memory) 33, CPU (microprocessor) 34, input port 35, and output port 36, which are connected with each other by a bidirectional bus 31. At the input port 35, output signals of the intake air amount detector 10, throttle valve opening degree sensor 14, $NO_X$ sensor 23, and atmospheric temperature sensor 24 are input through corresponding AD converters 37. At an accelerator pedal 40, a load sensor 41 generating an output voltage proportional to the amount of depression of the accelerator pedal 40 is connected. The output voltage of the load sensor 41 is input through the corresponding AD converter 37 to the input port 35. Furthermore, the input port 35 is connected to a crank angle sensor 42 generating an output pulse each time a crankshaft rotates by for example 30°. Inside the CPU 34, the engine speed is calculated based on the output signals of the crank angle sensor 42. On the other hand, the output port 36 is connected through corresponding drive circuits 38 to the spark plugs 3, the fuel injectors 4, the throttle valve drive use actuator 13, EGR control valve 19, and fuel pump 21.

Summary of Neural Network

Figure 2:
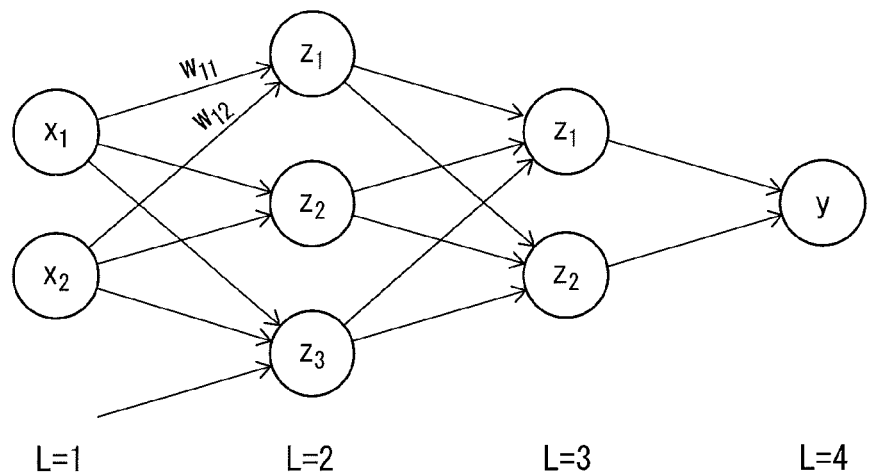
FIG. 2 is a view showing one example of a neural network.

In embodiments of the present invention, neural networks are used to estimate various values representing the performance of the internal combustion engine. FIG. 2 shows one example of a neural network. The circle marks in FIG. 2 show artificial neurons. In the neural network, these artificial neurons are usually called "node" or "unit" (in the present application, they are called "node"). In FIG. 2, L=1 shows an input layer, L=2 and L=3 show hidden layers, and L=4 shows an output layer. Further, in FIG. 2, $x_1$ and $x_2$ show output values from the nodes of the input layer (L=1), "y" shows the output value from the node of the output layer (L=4), $z_1$, $z_2$, and $z_3$ show output values from the nodes of one hidden layer (L=2), $z_1$ and $z_2$ show output values from the nodes of another hidden layer (L=3). Note that, the number of hidden layers may be made one or any other number, while the number of nodes of the input layer and number of nodes of the hidden layers may also be made any numbers. Note that, in the embodiments according to the present invention, the number of nodes of the output layer is made one node.

At the nodes of the input layer, the inputs are output as they are. On the other hand, at the nodes of one hidden layer (L=2), the output values $x_1$ and $x_2$ of the nodes of the input layer are input, while at the nodes of one hidden layer (L=2), the respectively corresponding weights "w" and biases "b" are used to calculate the sum input value "u". For example, a sum input value $u_k$ calculated at a node shown by $z_k$ (k=1, 2, 3) of one hidden layer (L=2) in FIG. 2 becomes as shown in the following formula:

$$U_k = \sum_{m=1}^{n} (x_m \cdot w_{km}) + b_k$$

Next, this sum input value $u_k$ is converted by an activating function "f" and is output from a node shown by $z_k$ of one hidden layer (L=2) as an output value $z_k$ (=f($u_k$)). The same is true for the other nodes of one hidden layer (L=2). On the other hand, the nodes of another hidden layer (L=3) receive as input the output values $z_1$, $z_2$, and $z_3$ of the nodes of one hidden layer (L=2). At the nodes of the other hidden layer (L=3), the respectively corresponding weights "w" and biases "b" are used to calculate the sum input value u(Σz·w+b). The sum input value "u" is similarly converted by an activating function and output from the nodes of the other hidden layer (L=3) as the output values $z_1$ and $z_2$. Note that, in embodiments according to the present invention, as this activating function, a Sigmoid function σ is used.

On the other hand, at the node of the output layer (L=4), the output values $z_1$ and $z_2$ of the nodes of the other hidden layer (L=3) are input. At the node of the output layer, the respectively corresponding weights "w" and biases "b" are used to calculate the sum input value u(Σz·w+b) or just the respectively corresponding weights "w" are used to calculate the sum input value u(Σz·w). In this embodiment according to the present invention, at the node of the output layer, an identity function is used, therefore, from the node of the output layer, the sum input value "u" calculated at the node of the output layer is output as it is as the output value "y".

Expression of Function by Neural Network

Figure 3A:
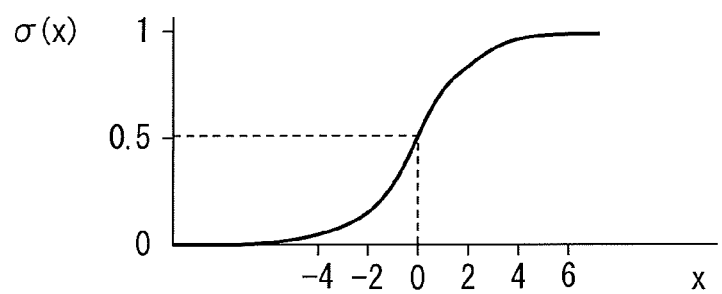
FIG. 3A and FIG. 3B are views showing changes in values of a Sigmoid function σ.
Figure 3B:
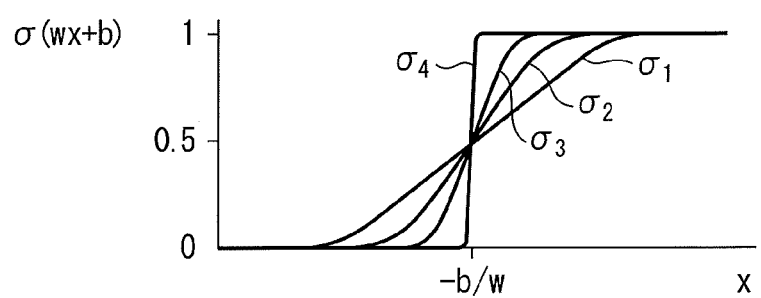

Now then, it is possible to express any function if using a neural network. Next, this will be simply explained. First, if explaining the Sigmoid function σ used as the activating function, the Sigmoid function σ is expressed as $\sigma(x)=1/(1+\exp(-x))$ and takes a value between 0 and 1 corresponding to the value of "x" as shown in FIG. 3A. Here, if replacing "x" with "wx+b", the Sigmoid function σ is expressed as $\sigma(wx+b)=1/(1+\exp(-wx-b))$. Here, if increasing the value of "w", as shown by the curves $\sigma_1$, $\sigma_2$, and $\sigma_3$ in FIG. 3B, the slant of the curved part of the Sigmoid function σ(wx+b) gradually becomes steeper. If making the value of "w" infinitely large, as shown by the curve $\sigma_4$ in FIG. 3B, the Sigmoid function σ(wx+b) changes in steps as shown in FIG. 3B at the "x" where x=-b/w(wx+b=0), that is, at the "x" where σ(wx+b)=0.5. If utilizing this property of the Sigmoid function σ, a neural network can be used to express any function.

Figure 4A:
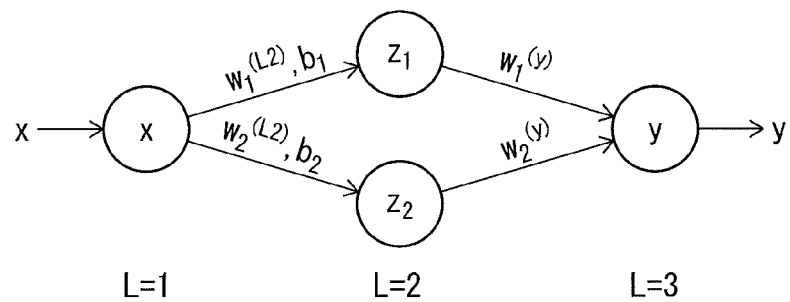
FIG. 4A and FIG. 4B respectively are views showing a neural network and output values from nodes of a hidden layer.

For example, using a neural network such as shown in FIG. 4A comprising an input layer (L=1) comprised of a single node, a hidden layer (L=2) comprised of two nodes, and an output layer (L=3) comprised of a single node, it is possible to express a function approximating a quadratic function. Note that, in this neural network, as shown in FIG. 4A, the node of the input layer (L=1) receives as input the input value "x", while the node shown by $z_1$ at the hidden layer (L=2) receives as input the input value $u=x \cdot w_1^{(L2)}+b_1$ calculated using a weight $w_1^{(L2)}$ and a bias $b_1$. This input value "u" is converted by the Sigmoid function $\sigma(x \cdot w_1^{(L2)}+b_1)$ and output as the output value $z_1$. Similarly, the node shown by $z_2$ at the hidden layer (L=2) receives as input the input value $u=x \cdot w_2^{(L2)}+b_2$ calculated using the weight $w_2^{(L2)}$ and bias $b_2$. This input value "u" is converted by the Sigmoid function $\sigma(x \cdot w_2^{(L2)}+b_2)$ and output as the output value $z_2$.

On the other hand, the node of the output layer (L=3) receives as input the output values $z_1$ and $z_2$ of the nodes of the hidden layer (L=2). At the node of the output layer, the respectively corresponding weights $w_1^{(y)}$ and $w_2^{(y)}$ are used to calculate the sum input value $u(\Sigma z \cdot w \cdot z_1 \cdot w_1^{(y)}+z_2 \cdot w_2^{(y)})$. As explained above, in the embodiments according to the present invention, at the node of the output layer, an identity function is used. Therefore, from the node of the output layer, the sum input value "u" calculated at the node of the output layer is output as is as the output value "y".

Figure 4B:
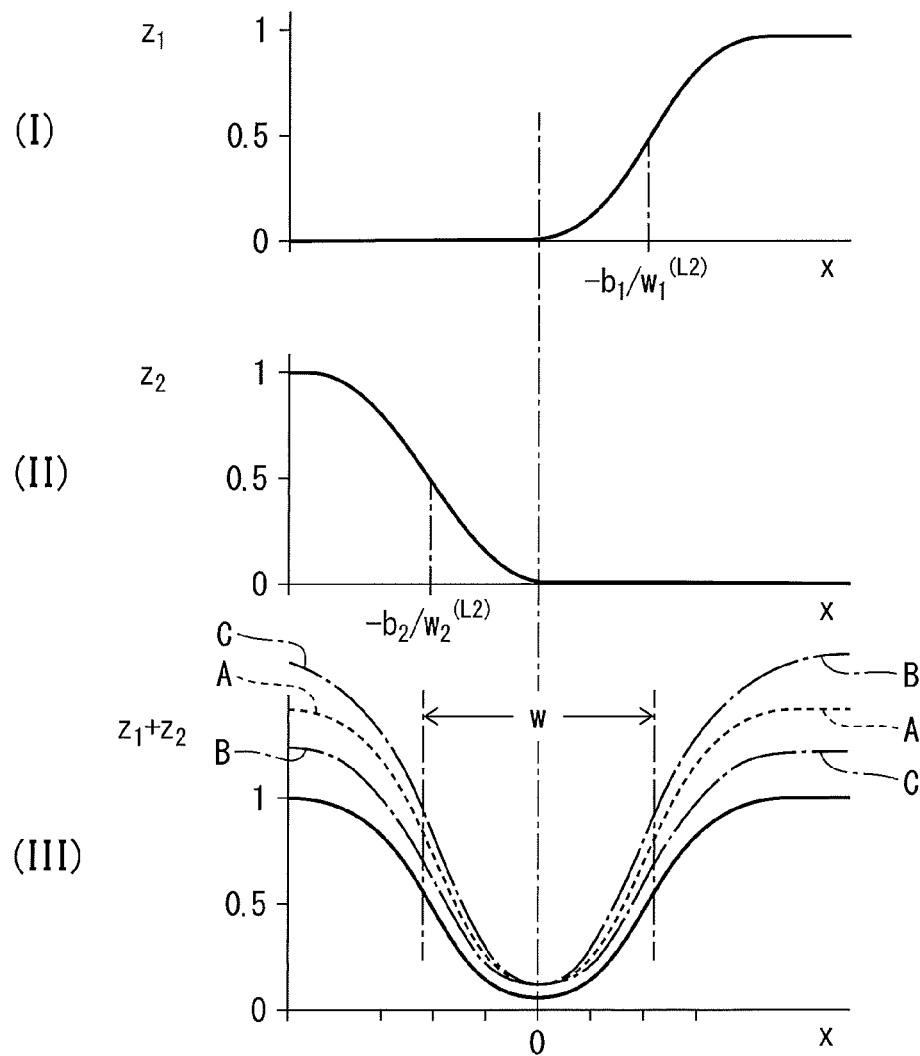

FIG. 4B(I) shows the output value $z_1$ from a node of one hidden layer (L=2) when the weight $w_1^{(L2)}$ and bias $b_1$ are set so that the value of the Sigmoid function $\sigma(x \cdot w_1^{(L2)}+b_1)$ at x=0 becomes substantially zero. On the other hand, at the Sigmoid function $\sigma(x \cdot w_2^{(L2)}+b_2)$, for example, if making the weight $w_2^{(L2)}$ a minus value, the shape of the curve of the Sigmoid function $\sigma(x \cdot w_2^{(L2)}+b_2)$ becomes a shape decreasing along with an increase of "x" such as shown by FIG. 4B(II). At FIG. 4B(II), the change of the output value $z_2$ from the node of the hidden layer (L=2) when the weight $w_2^{(L2)}$ and bias $b_2$ are set so that the value of the Sigmoid function $\sigma(x \cdot w_2^{(L2)}+b_2)$ at x=0 becomes substantially zero is shown.

On the other hand, in FIG. 4B(III), the sum $(z_1-z_2)$ of the output values $z_1$ and $z_2$ from the nodes of the hidden layer (L=2) is shown by the solid line. Note that, as shown in FIG. 4A, the output values $z_1$ and $z_2$ are multiplied with the respectively corresponding weights $w_1^{(y)}$ and $w_2^{(y)}$. In FIG. 4B(III), the change in the output value "y" when $w_1^{(y)}$ and $w_2^{(y)} > 1$ and $w_1^{(y)} > w_2^{(y)}$ is shown by the broken line A.

Furthermore, in FIG. 4B(III), the change in the output value "y" when $w_1(Y)$ and $w_2^{(y)} > 1$ and $w_1^{(y)} > w_2^{(y)}$ is shown by the one-dot broken line B, while in FIG. 4B(III), the change in the output value "y" when $w_1^{(y)}$ and $w_2^{(y)} > 1$ and $w_1^{(y)} < w_2^{(y)}$ is shown by the one-dot broken line C. In FIG. 4B(III), the shape of the broken line A in the range shown by W shows a curve approximating a quadratic function such as shown by $y=ax^2$ ("a" is a coefficient), therefore, it will be understood that by using a neural network such as shown in FIG. 4A, a function approximating a quadratic function can be expressed.

Figure 5A:
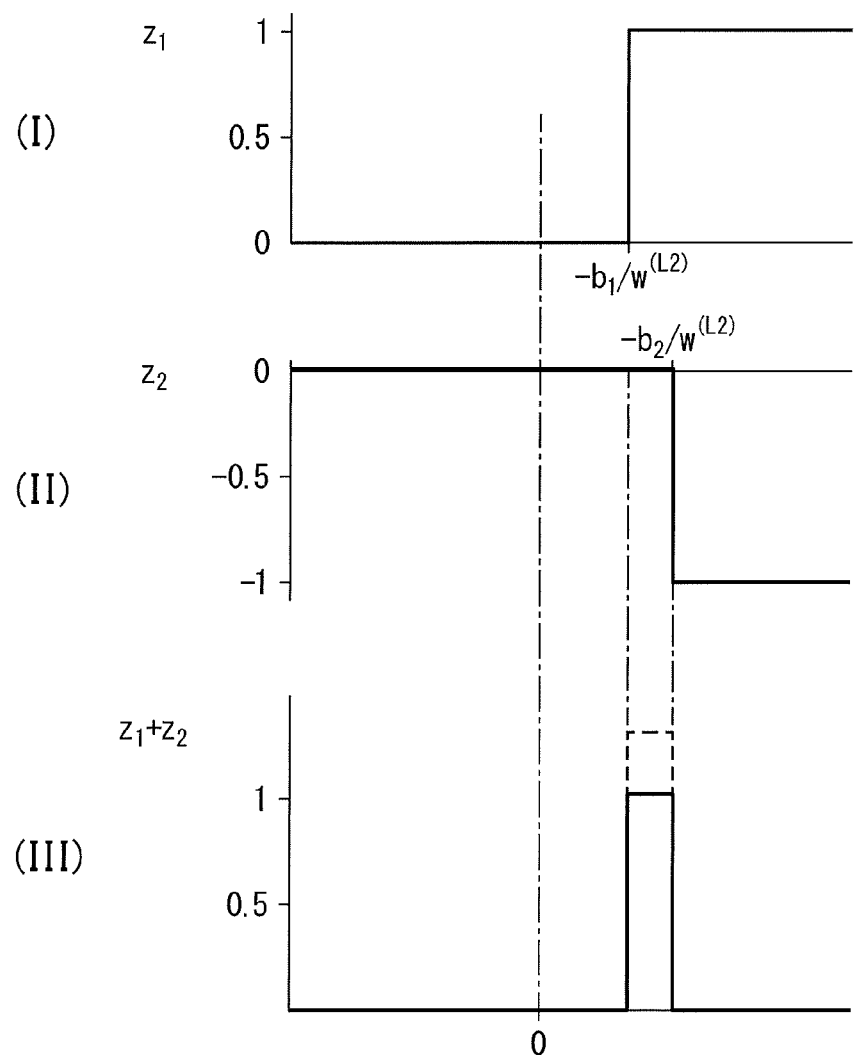
FIG. 5A and FIG. 5B respectively are views showing output values from nodes of a hidden layer and output values from nodes of an output layer.

On the other hand, FIG. 5A shows the case where the values of the weights $w_1^{(L2)}$ and $w_2^{(L2)}$ in FIG. 4A are made larger so as to make the value of the Sigmoid function σ change in steps such as shown in FIG. 3B. In FIG. 5A(I), the output value $z_1$ from a node of the hidden layer (L=2) when the weight $w_1^{(L2)}$ and bias $b_1$ are set so that the value of the Sigmoid function $\sigma(x \cdot w_1^{(L2)}+b_1)$ increases in steps at $x=-b_1/w_1^{(L2)}$ is shown. Further, in FIG. 5A(II), the output value $z_2$ from a node of the hidden layer (L=2) when the weight $w_2^{(L2)}$ and bias $b_2$ are set so that the value of the Sigmoid function $\sigma(x \cdot w_2^{(L2)}+b_2)$ decreases in steps at $x=-b_2/w_2^{(L2)}$ slightly larger than $x=--b_1/w_1^{(L2)}$ is shown. Further, in FIG. 5A(III), the sum $(z_1+z_2)$ of the output values $z_1$ and $z_2$ from the nodes of the hidden layer (L=2) is shown by the solid line. As shown in FIG. 4A, the output values $z_1$ and $z_2$ are multiplied with the respectively corresponding weights $w_1^{(y)}$ and $w_2^{(y)}$. In FIG. 5A(III), the output value "y" when $w_1^{(y)}$ and $w_2^{(y)} > 1$ is shown by the broken lines.

Figure 5B:
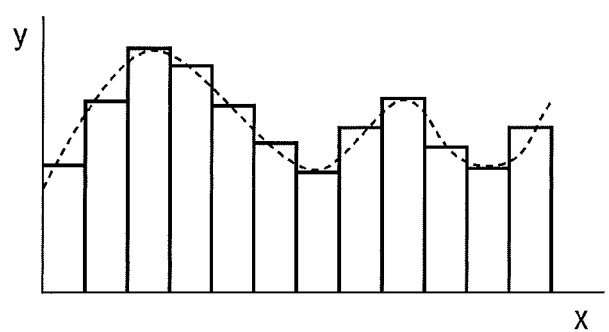
Figure 6A:
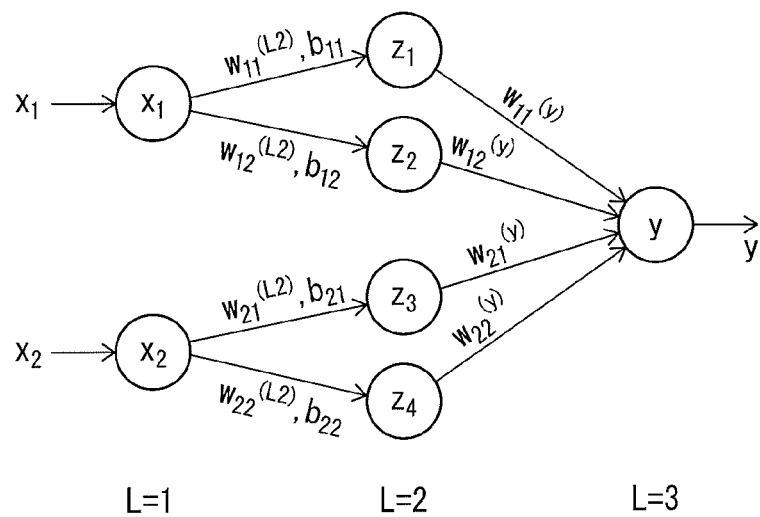
FIG. 6A and FIG. 6B respectively are views showing a neural network and output values from nodes of an output layer.
Figure 6B:
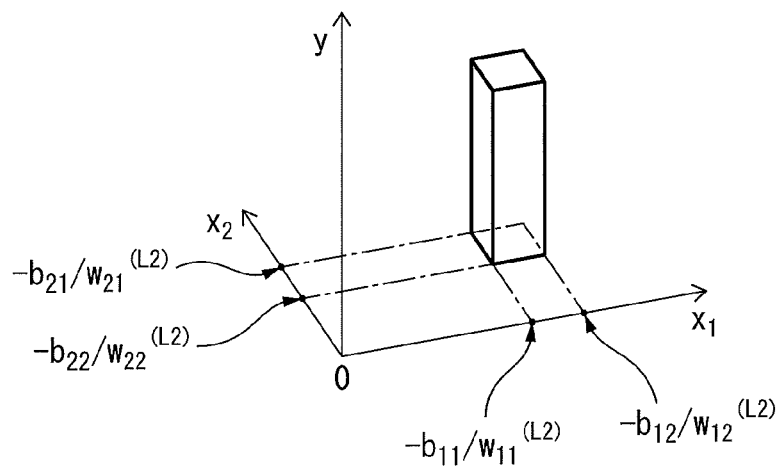

In this way, in the neural network shown in FIG. 4A, from the pair of nodes of the hidden layer (L=2), a bar-shaped output value "y" such as shown in FIG. 5A(III) is obtained. Therefore, if increasing the number of paired nodes in the hidden layer (L=2) and suitably setting the values of the weights "w" and biases "b" at the nodes of the hidden layer (L=2), it becomes possible to express a function approximating the function y=f(x) such as shown by the curved line of the broken line in FIG. 5B. Note that, in FIG. 5B, the bars are drawn contiguous with each other, but in actuality the bars sometimes partially overlap. Further, in actuality, the value of "w" is not infinitely large, so the bars do not become precise bar shapes but become curved shapes like the top half of the curved part shown by $\sigma_3$ in FIG. 3B. Note that, while a detailed explanation will be omitted, as shown in FIG. 6A, if providing pairs of nodes at the hidden layer (L=2) respectively corresponding to the two different input values $x_1$ and $x_2$, as shown in FIG. 6B, column-shaped output values "y" corresponding to the input values $x_1$ and $x_2$ are obtained. In this case, if providing a large number of paired nodes at the hidden layer (L=2) for the input values $x_1$, $x_2$, a plurality of column-shaped output values "y" respectively corresponding to the different input values $x_1$ and $x_2$ are obtained. Therefore, it will be understood that it is possible to express a function showing the relationship between the input values $x_1$ and $x_2$ and the output values "y". Note that, in the case of three or more different input values "x" as well, similarly, it is possible to express a function showing the relationship between the input values "x" and the output values "y".

Learning in Neural Network

On the other hand, in the embodiments according to the present invention, an error backpropagation algorithm is used to learn the values of the weights "w" and biases "b" in a neural network. This error backpropagation algorithm is known. Therefore, the error backpropagation algorithm will be explained simply below in its outlines. Note that, a bias "b" is one kind of weight "w", so in the following explanation, a bias "b" is deemed one type of weight "w". Now then, in the neural network such as shown in FIG. 2, if the weight at the input value $u^{(L)}$ to the nodes of each layer of L=2, L=3, or L=4 is expressed by $w^{(L)}$, the differential due to the weight $w^{(L)}$ of the error function E, that is, the gradient $\partial E/\partial w^{(L)}$, can be rewritten as shown in the following formula:

$$\partial E/\partial w^{(L)} = (\partial E/\partial u^{(L)})(\partial u^{(L)}/\partial w^{(L)}) \qquad (1)$$

where, $z^{(L-1)} \cdot \partial w^{(L)} = \partial u^{(L)}$, so if $(\partial E/\partial u^{(L)}) = \delta^{(L)}$, the above formula (1) can be shown by the following formula:

$$\partial E/\partial w^{(L)} = \delta^{(L)} \cdot z^{(L-1)} \qquad (2)$$

Here, if $u^{(L)}$ fluctuates, fluctuation of the error function E is caused through the change in the sum input value $u^{(L+1)}$ of the following layer, so $\delta^{(L)}$ can be expressed by the following formula.

$$\delta^{(L)} = (\partial E/\partial u^{(L)}) = \sum_{k=1}^{k} (\partial E/\partial u_k^{(L+1)})(\partial u_k^{(L+1)}/\partial u^{(L)}) \; (k=1, 2...) \qquad (3)$$

where, if $z^{(L)} = f(u^{(L)})$, the input value $u_k^{(L+1)}$ appearing at the right side of the above formula (3) can be expressed by the following formula:

$$\text{Input value } u_k^{(L+1)} = \Sigma_{k=1}{}^k w_k^{(L+1)} \cdot z^{(L)} = \Sigma_{k=1}{}^k w_k^{(L+1)} \cdot f(u^{(L)}) \qquad (4)$$

where, the first term $(\partial E/\partial u^{(L+1)})$ at the right side of the above formula (3) is $\delta^{(L+1)}$, and the second term $(\partial u_k^{(L+1)}/\partial u^{(L)})$ at the right side of the above formula (3) can be expressed by the following formula:

$$\delta(w_k^{(L+1)} \cdot z^{(L)})/\delta u^{(L)} = w_k^{(L+1)} \cdot \delta f(u^{(L)})/\delta u^{(L)} = w_k^{(L+1)} \cdot f'(u^{(L)}) \qquad (5)$$

Therefore, $\delta^{(L)}$ is expressed by the following formula:

$$\delta^{(L)} = \sum_{k=1}^{k} w_k^{(L+1)} \cdot \delta^{(L+1)} \cdot f'(u^{(L)})$$

That is, $$\delta^{(L-1)} = \sum_{k=1}^{k} w_k^{(L)} \cdot \delta^{(L)} \cdot f'(u^{(L-1)}) \qquad (6)$$

That is, if $\delta^{(L+1)}$ is found, it is possible to find $\delta^{(L)}$.

Now then, when training data $y_t$ is found for a certain input value, and the output value from the output layer corresponding to this input value is "y", if the square error is used as the error function, the square error E is found by $E=\frac{1}{2}(y-y_t)^2$. In this case, at the node of the output layer (L=4) of FIG. 2, the output value "y" becomes $f(u^{(L)})$, therefore, in this case, the value of $\delta^{(L)}$ at the node of the output layer (L=4) becomes like in the following formula:

$$\delta^{(L)} = \partial E/\partial u^{(L)} = (\partial E/\partial y)(\partial y/\partial u^{(L)}) = (y - y_t) \cdot f'(u^{(L)}) \qquad (7)$$

In this regard, in the embodiments of the present invention, as explained above, $f(u^{(L)})$ is an identity function and $f'(u^{(L)})=1$. Therefore, $\delta^{(L)} = y - y_t$ and $\delta^{(L)}$ are found.

If $\delta^{(L)}$ is found, the $\delta^{(L-1)}$ of the previous layer is found by using the above formula (6). The $\delta$ of the previous layer is successively found in this way. Using these values of $\delta$, from the above formula (2), the differential of the error function E, that is, gradient $\partial E/\partial w^{(L)}$, is found for each weight "w". If the gradient $\partial E/\partial w^{(L)}$ is found, this gradient $\partial E/\partial w^{(L)}$ is used to update the value of the weight "w" so that the value of the error function E decreases. That is, the value of the weight "w" is learned. Note that, when as the training data, a batch or minibatch is used, as the error function E, the following mean squared error E is used:

$$\text{Mean Squared error } E = \frac{1}{n}\sum_{k=1}^{k}\frac{1}{2}(y_k - y_t)^2 \qquad (8)$$

($k = 1, 2..., n$ is total number of training data)

On the other hand, if online learning designed to sequentially calculate the square error is performed, as the error function E, the above square error E is used.

Embodiments According to Present Invention

Next, referring to FIG. 7A to FIG. 10, a first embodiment of the present invention will be explained. In this first embodiment according to the present invention, as shown in FIG. 4A, a neural network comprised of a single input layer (L=1), a single layer hidden layer (L=2), and a single output layer (L=3) is used. Further, this first embodiment shows the case of using the neural network such as shown in FIG. 4A for learning the weight of the neural network so that the output value "y" is expressed by a quadratic function of the input value "x". Note that, in FIG. 7A to FIG. 8B, the broken lines show the waveforms of true quadratic functions, the blacked out dots show the training data, the ring shaped dots show the output value "y" after learning the weight of the neural network so that the difference between the output values "y" corresponding to the input value "x" and the training data becomes smaller, and the solid curves show the relationship between the input value "x" and the output value "y" after finishing learning. Further, in FIG. 7A to FIG. 8B, A to B, that is, R, show a preset range of the input value "x".

Figure 7A:
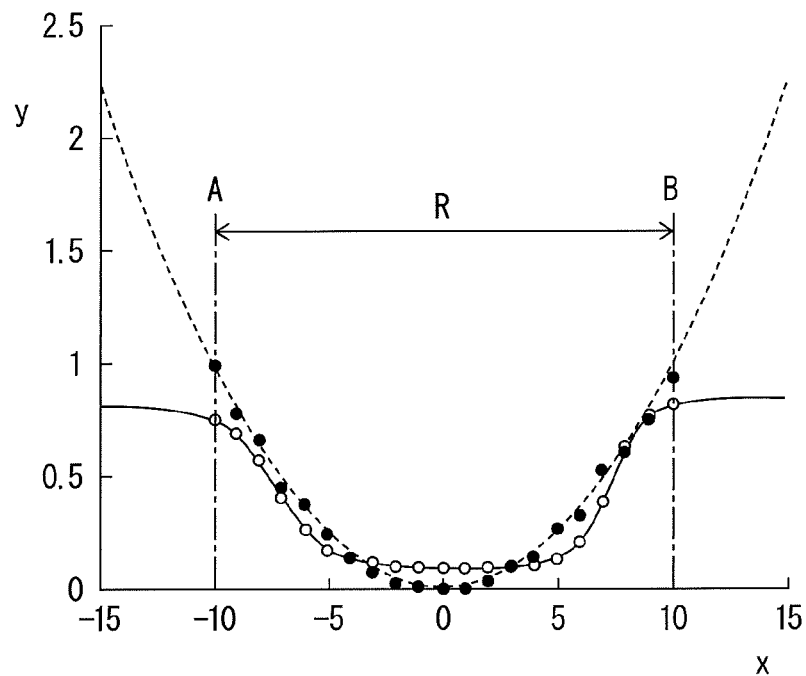
FIG. 7A and FIG. 7B are views for explaining the problem to be solved by the present invention.
Figure 7B:
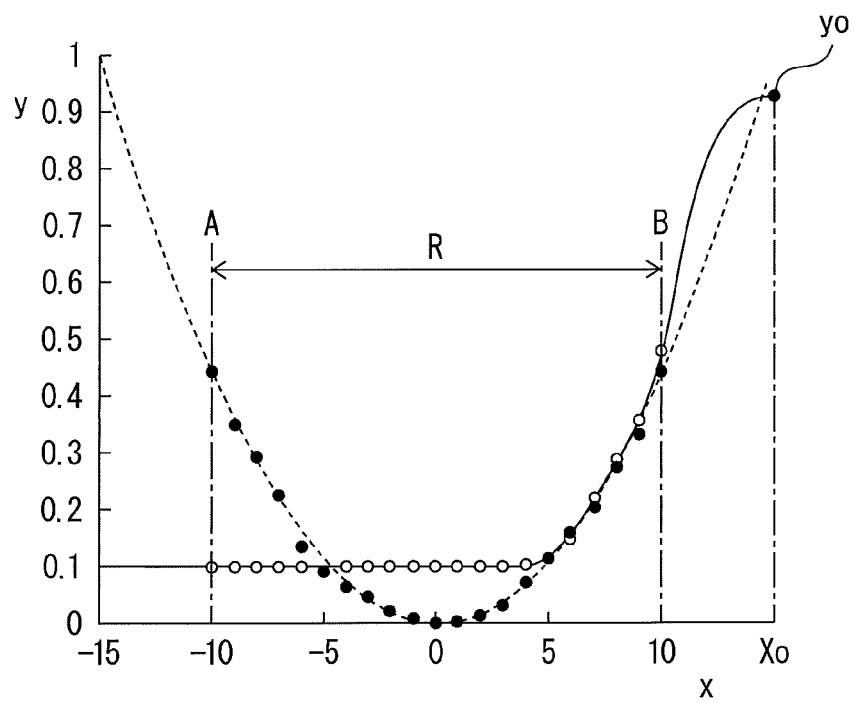

Now then, FIG. 7A and FIG. 7B are views for explaining the problem to be solved by the present invention. Therefore, first, while referring to FIG. 7A and FIG. 7B, the problem to be solved by the present invention will be explained. FIG. 7A shows the case where, as shown in FIG. 4A, a neural network having two nodes at the hidden layer (L=2) is used to learn the weight of a neural network so that the output amount "y" becomes a quadratic function $y=ax^2$ ("a" is a constant) of the input value "x" corresponding to input value "x" in a preset range R. As shown in FIG. 7A, even if the hidden layer (L=2) of the neural network only has two nodes, if the input value "x" is in the preset range R, as shown by the solid line, a function close to a quadratic function is expressed.

That is, if learning is performed for the preset range R of the input value "x", in the preset range R, by using a suitable combination of the curve parts of a plurality of Sigmoid functions σ, the output value "y" is expressed as a function close to a quadratic function. However, outside the preset range R of the input value "x", learning is not performed, so as shown by the solid line, the straight line parts at the two ends of the curved part where the Sigmoid function σ greatly changes appear as they are as the output value "y". Therefore, the output value "y" after the completion of learning, as shown by the solid line in FIG. 7A, appears in the form of a function close to a quadratic function in the preset range R of the input value "x", while appear in a form close to a straight line not changing much at all with respect to the input value "x" outside of the preset range R of the input value "x". Therefore, as shown in FIG. 7A, outside of the preset range R of the input value "x", the output value "y" greatly deviates from the quadratic curve shown by the broken line.

On the other hand, FIG. 7B shows the case where, when the input value "x", for example, as shown in FIG. 7B by $x_0$, ends up becoming outside of the preset range R of the input value "x", the weight of the neural network is learned including the output value $y_0$ when the input value "x" is $x_0$ in the training data. If in this way learning is performed including also the output value $y_0$ of the range R where the input value "x" is not preset, the straight line part where $z_1=1$ in the Sigmoid function σ shown by $z_1$ in FIG. 4B rises to include the output value $y_0$, the Sigmoid function σ shown by $z_2$ in FIG. 4B moves overall to the right, and the value of the Sigmoid function σ becomes lower overall, so as shown by the solid line in FIG. 7B, in the preset range R, the value of the output value "y" after the end of learning end up greatly deviating from a quadratic curve. If in this way it ends up becoming outside the preset range R of the input value "x", a suitable output value "y" cannot be obtained.

Figure 8A:
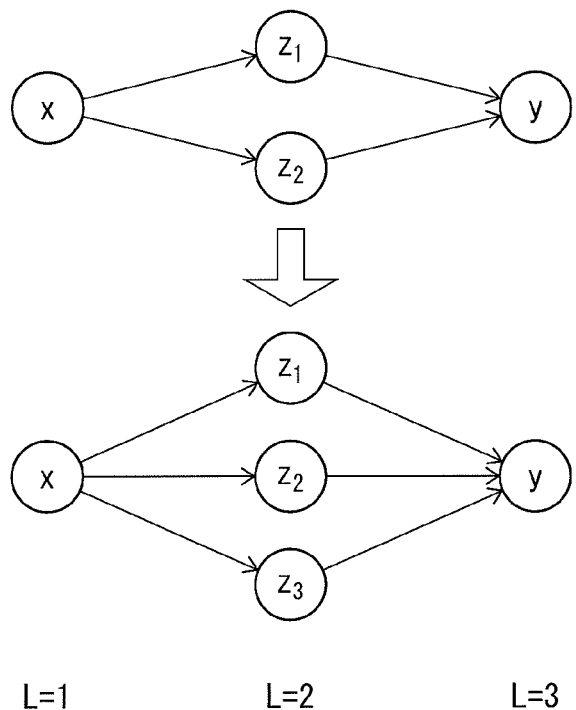
FIG. 8A and FIG. 8B respectively are views showing a neural network and the relationship between input values and output values of the neural network.
Figure 8B:
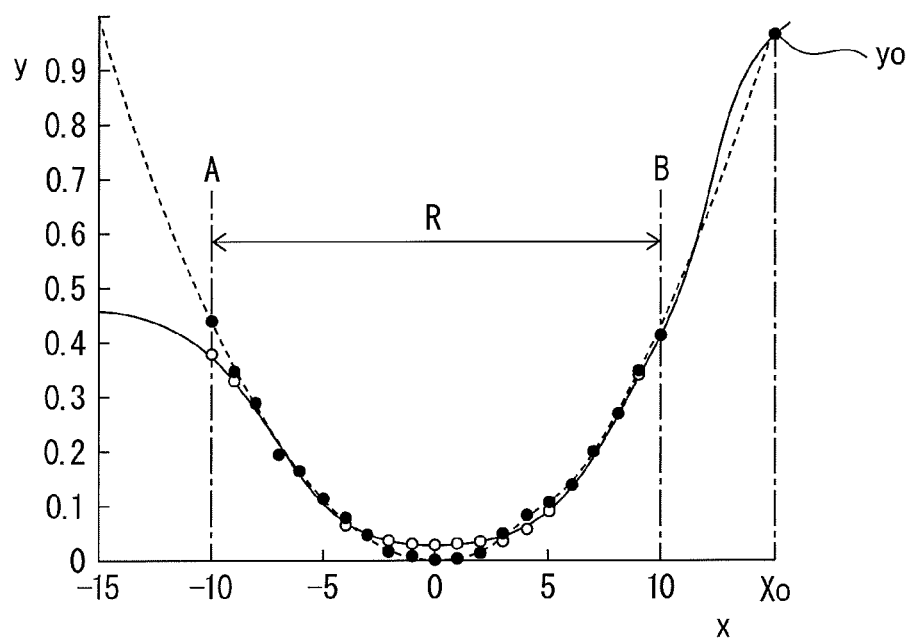

In this regard, however, in this case, if increasing the number of nodes of the hidden layer (L=2) of the neural network, even if the input value "x" becomes outside the presumed usable range R, it was revealed that suitable output value "y" was obtained. Next, this will be explained while referring to FIG. 8A and FIG. 8B showing the first embodiment according to the present invention. FIG. 8B shows the result of learning when learning the weight of a neural network including also in the training data the output value $y_0$ when the input value "x" is $x_0$ in the state increasing the number of nodes of the hidden layer (L=2) of the neural network from two to three as shown in FIG. 8A. If the number of nodes of the hidden layer (L=2) of the neural network is made to increase in this way, as shown by the solid line in FIG. 8B, the values of the output value "y" becomes superposed over the quadratic curve shown by the broken line. Therefore, as shown in FIG. 8B, it will be understood that even if the input value "x" becomes outside the presumed usable range R, a suitable output value "y" is obtained by increasing the number of nodes of the hidden layer (L=2) of the neural network. Therefore, in the first embodiment according to the present invention, when the input value "x" is outside the presumed usable range R, the number of nodes of the hidden layer (L=2) of the neural network is made to increase.

Next, a specific example of the input value "x" and the output value "y" shown in FIG. 7A to FIG. 8B will be explained. In the field of internal combustion engines, when the value of an operating parameter of the engine is defined as the input value "x", sometimes the actual output amount "y" will take the form of a quadratic function of the input value "x". As one example of such a case, there is the case where the value of an operating parameter of the engine, that is, the input value "x", is the engine speed N (rpm) and the output amount "y" is the amount of exhaust loss. In this case, if the engine is determined, the usable range of the engine speed N is determined accordingly, therefore, the range of engine speed N is preset. On the other hand, the amount of exhaust loss shows the amount of heat energy exhausted from the engine combustion chambers. This is proportional to the amount of exhaust gas discharged from the engine combustion chambers and is proportional to the temperature difference between the temperature of the exhaust gas discharged from the engine combustion chambers and the outside air temperature. This amount of exhaust loss is calculated based on the detected values of the gas temperature etc. when actually operating an engine. Therefore, this calculated amount of exhaust loss shows a value obtained by actual measurement.

As one specific example, when the input value "x", that is, the engine speed N, is in a preset range R, the training data obtained by actual measurement is used to learn the weight of the neural network so that the difference between the output value "y" and the training data corresponding to the input value "x" becomes smaller. On the other hand, when the input value "x", that is, the engine speed N, is outside a preset range, the number of nodes of the hidden layer of the neural network is increased and the training data obtained by actual measurement corresponding to the newly acquired input value "x", that is, the engine speed N, is used to learn the weight of the neural network so that the difference between the output value "y" and the training data corresponding to the input value "x" becomes smaller. Therefore, in this case, even when the engine speed N becomes higher than the preset range R, it becomes possible to relatively accurately estimate the amount of exhaust loss.

Figure 9:
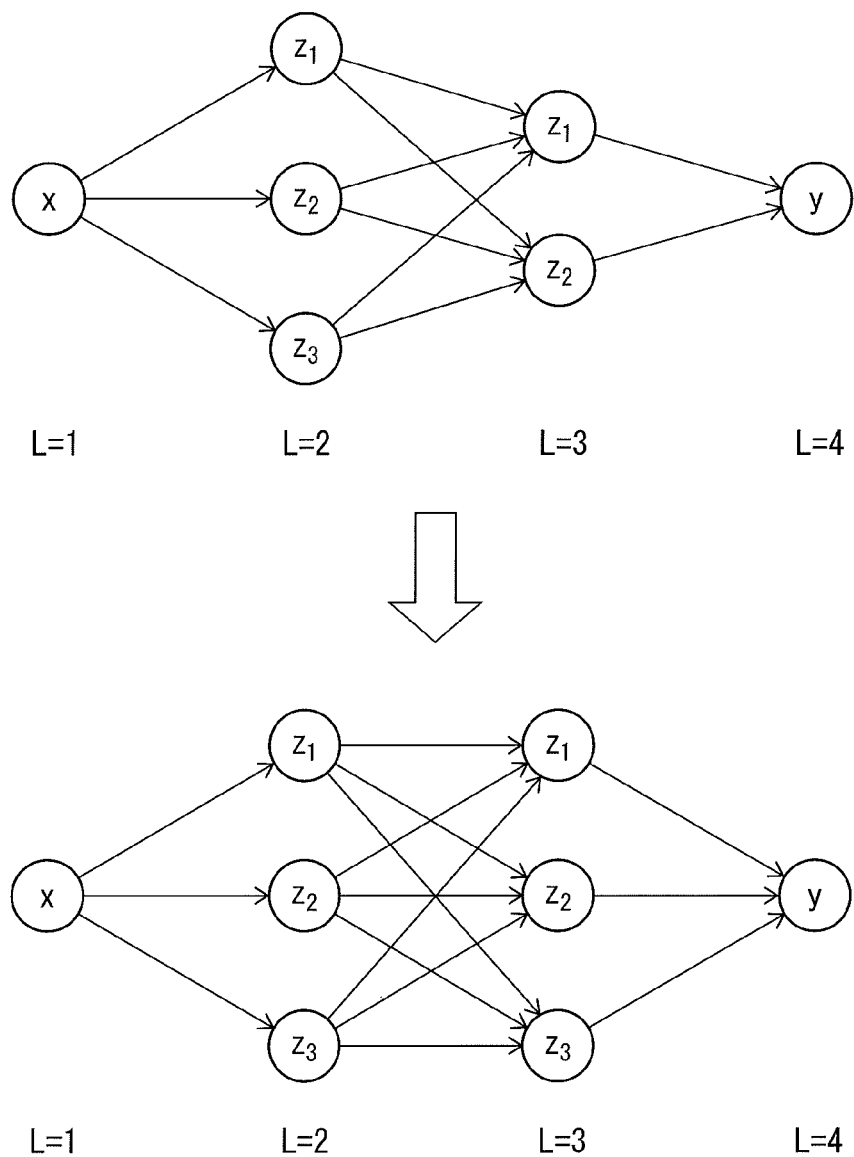
FIG. 9 is a view showing a neural network.

Note that, the first embodiment according to the present invention can also be applied to a neural network having a plurality of hidden layers (L=2 and L=3) such as shown in FIG. 9. In the neural network such as shown in FIG. 9, the shape of the function output from the output layer (L=4) is determined by the output values $z_1$ and $z_2$ of the nodes of the hidden layer (L=3) one layer before the output layer (L=4). That is, by what kind of function the output value "y" can be expressed is governed by the number of nodes of the hidden layer (L=3) one layer before the output layer (L=4). Therefore, in a neural network such as shown in FIG. 9, when increasing the number of nodes of the hidden layer, as shown in FIG. 9, the number of nodes of the hidden layer (L=3) one layer before the output layer (L=4) is made to increase.

Figure 10:
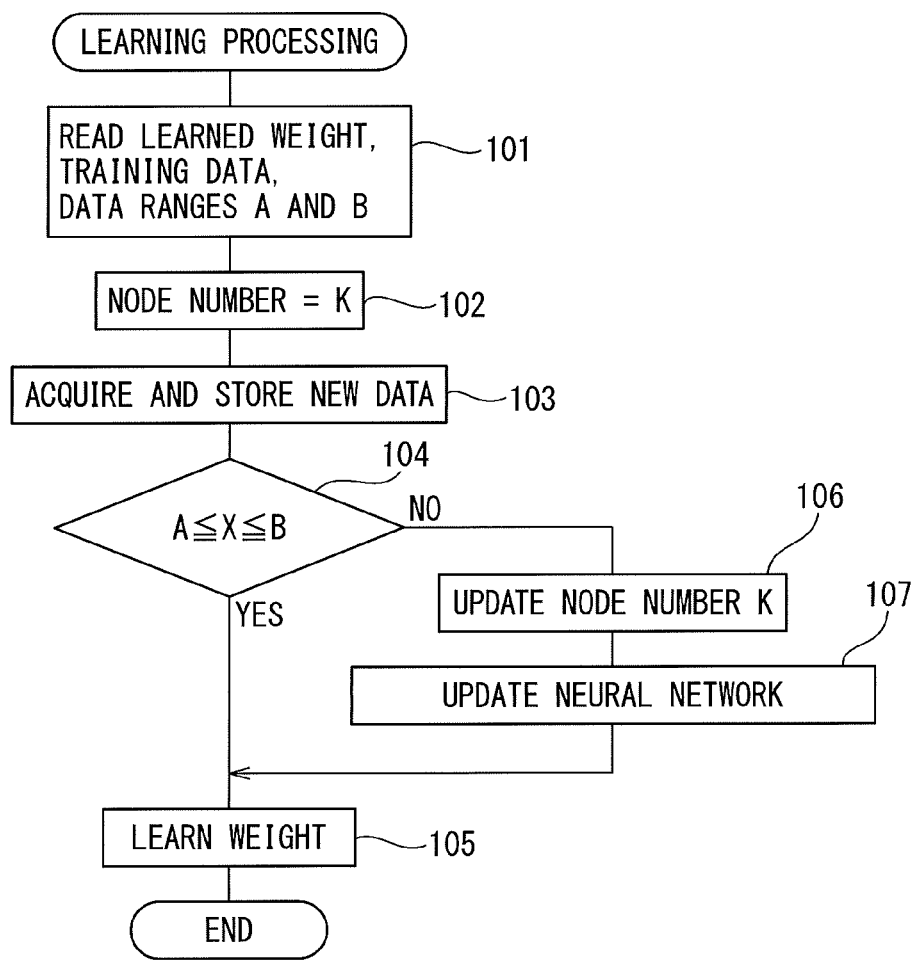
FIG. 10 is a flow chart for performing learning processing.

In the above-mentioned first embodiment, the amounts of exhaust loss actually measured corresponding to the various input values "x" in the preset range R are found in advance as training data. The structure of the neural network is determined by these input value data and training data. The weight of the neural network is learned in advance so that the difference between the output value "y" and the training data corresponding to the input value "x" becomes smaller. In this first embodiment, the weight of the neural network when using a neural network of the same structure as the neural network used in prior learning and finished being learned is used for further learning onboard during vehicle operation. FIG. 10 shows the learning processing routine of the first embodiment performed onboard. Note that, the learning processing routine shown in FIG. 10 is executed by interruption every fixed time period, for example, every second.

Referring to FIG. 10, first, at step 101, the learned weight, the training data which had been used in previous learning, and values A and B showing the range R of input data stored in the storage part of the electronic control unit 30 are read. This learned weight is used as the initial value of the weight. Next, at step 102, the number of nodes K of the hidden layer one layer before the output layer of the neural network which had been used in the previous learning is read. Next, the routine proceeds to step 103 where a new input value "x", that is, new data, is acquired. This new input value "x", that is, the new data, is stored in the storage part of the electronic control unit 30. Furthermore, at step 103, the actually measured value of the amount of exhaust loss corresponding to the new input value "x" is stored as training data in the storage part of the electronic control unit 30.

Next, at step 104, it is judged if the new input value "x" is between A and B showing the range R of input data, that is, if the new input value "x" is A or more and B or less. When the new input value "x" is between A and B showing the range R of input data, the routine proceeds to step 105 where the input value "x" is input to a node of the input layer of neural network. Based on the output value "y" output from the node of the output layer of the neural network and the training data, using the error backpropagation algorithm, the weight of the neural network is learned so that the difference between the output value "y" and the training data becomes smaller.

On the other hand, when at step 104 it is judged that the new input value "x" is not between A and B showing the range R of input data, the routine proceeds to step 106 where the number of nodes K of the hidden layer one layer before the output layer of the neural network is updated and the number of nodes K of the hidden layer one layer before the output layer is made to increase. At this time, in the first embodiment, the number of nodes K of the hidden layer one layer before the output layer is increased by just 1. Next, at step 107, the neural network is updated so as to make the number of nodes K of the hidden layer one layer before the output layer increase, then the routine proceeds to step 105. At step 105, the training data newly obtained corresponding to the new input value "x" is also included in the training data and the weight of the updated neural network is learned so that the difference between the output value "y" and the training data becomes smaller.

Now then, the internal combustion engine used in the embodiments of the present invention, as shown in FIG. 1, is provided with the electronic control unit 30. This electronic control unit 30 is provided with a parameter value acquiring part for acquiring the values of the operating parameters of the engine, a processing part using a neural network comprised of an input layer, hidden layer, and an output layer to perform processing, and a storage part. Here, the input port 35 shown in FIG. 1 forms the above parameter value acquiring part, the CPU 34 forms the above-mentioned processing part, and the ROM 32 and RAM 33 form the above-mentioned storage part. Note that, at the CPU 34, that is, the above-mentioned processing part, the values of the operating parameters of the engine are input to the input layer, while output values changing in accordance with the values of the operating parameters of the engine are output from the output layer. Further, ranges R preset for the values of the operating parameters of the engine are stored in advance in the ROM 32, that is, in the above-mentioned storage part. Furthermore, the learned weight and the training data which had been used in the previous learning are stored in the RAM 33, that is, the above-mentioned storage part.

That is, in the first embodiment according to the present invention, the ranges of the values of the operating parameters of the engine are preset and the number of neural networks and the number of nodes of the hidden layers of the neutral networks corresponding to the ranges of the values of the operating parameters of the engine are preset. The training data obtained by actual measurement with respect to the values of the operating parameters of the engine in the preset ranges are stored in the storage part. When the value of an operating parameter of the engine newly acquired by the parameter value acquiring part is inside the preset range, the training data stored in the storage part is used by the processing part to learn the weight of the neural network so that the difference between the output value changing corresponding to the value of that operating parameter of the engine and the training data corresponding to the value of that operating parameter of the engine becomes smaller. When the value of an operating parameter of the engine newly acquired by the parameter value acquiring part is outside the preset range, if there are one or more number of training data obtained by actual measurement with respect to the newly acquired value of the operating parameter of the engine, the number of nodes of the hidden layer one layer before the output layer of the neural network is increased and the training data obtained by actual measurement corresponding to the newly acquired value of the operating parameter of the engine is used by the processing part to learn the weight of the neural network so that difference between the output value changing corresponding to the value of that operating parameter of the engine and the training data corresponding to the value of that operating parameter of the engine becomes smaller. The neural network with the learned weight is used to output an output value corresponding to the value of the operating parameter of the engine.

In this case, when the value of an operating parameter of the engine newly acquired by the parameter value acquiring part is outside the preset range, it is also possible to make the number of nodes of the hidden layer one layer before the output layer of the neural network increase if the number of the training data obtained by actual measurement with respect to the newly acquired value of the operating parameter of the engine is a two or more certain number or more. Therefore, in the first embodiment, when the value of an operating parameter of the engine newly acquired by the parameter value acquiring part is outside the preset range, the number of nodes of the hidden layer one layer before the output layer of the neural network is increased corresponding to the number of training data obtained by actual measurement with respect to the newly acquired value of that operating parameter of the engine.

Figure 11:
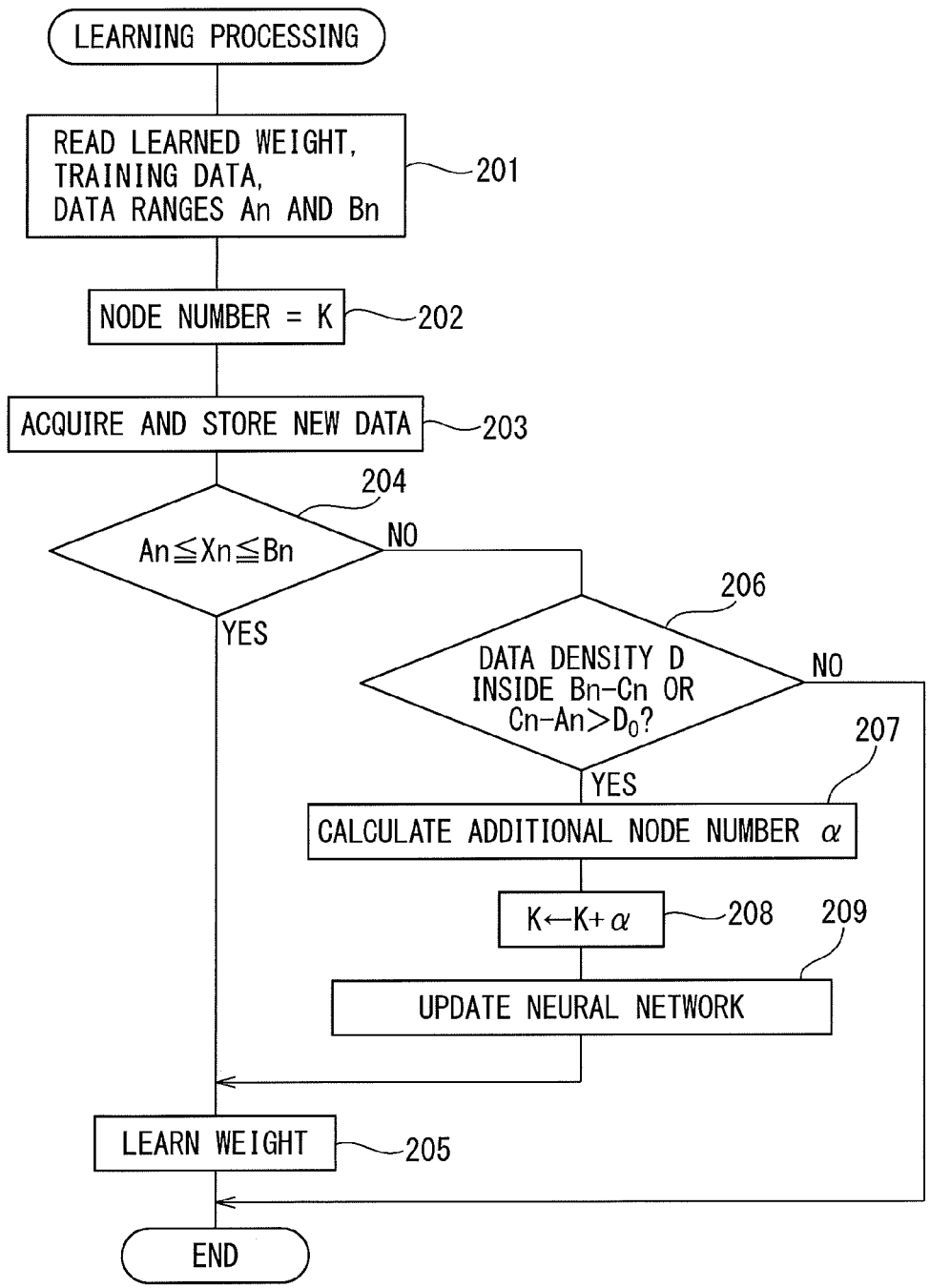
FIG. 11 is a flow chart showing another embodiment for performing learning processing.
Figure 12:
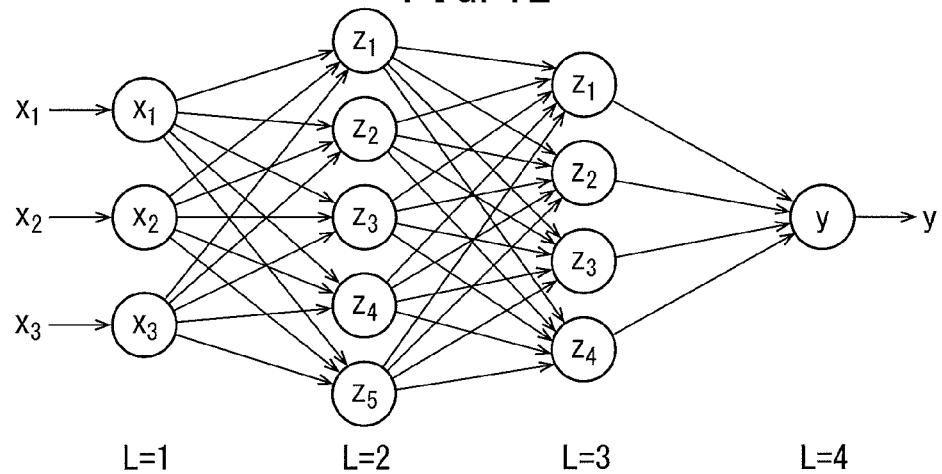
FIG. 12 is a view showing a neural network.

FIG. 11 to FIG. 13B show a second embodiment according to the present invention. In this second embodiment, the operating parameters of the engine are comprised of a plurality of operating parameters. The weight of the neural network is learned based on the values of the plurality of operating parameters. As one specific example, the case is shown of creating a neural network model where the operating parameters of the engine are comprised of the engine speed, accelerator opening degree (amount of depression of accelerator), and outside air temperature and an output torque of the engine is estimated based on the values of these operating parameters of the engine. In one specific example, as shown in FIG. 12, the input layer (L=1) of the neural network is comprised of three nodes. To these nodes, an input value $x_1$ showing the engine speed, an input value $x_2$ showing the accelerator opening degree, and an input value $x_3$ showing the outside air temperature are input. Further, the number of the hidden layers (L=2 and L=3) can be made one layer or any number of layers. The numbers of nodes of the hidden layers (L=2 and L=3) can also be made any numbers. Note that, in the second embodiment, the number of nodes of the output layer (L=4) is made a single node.

Figure 13A:
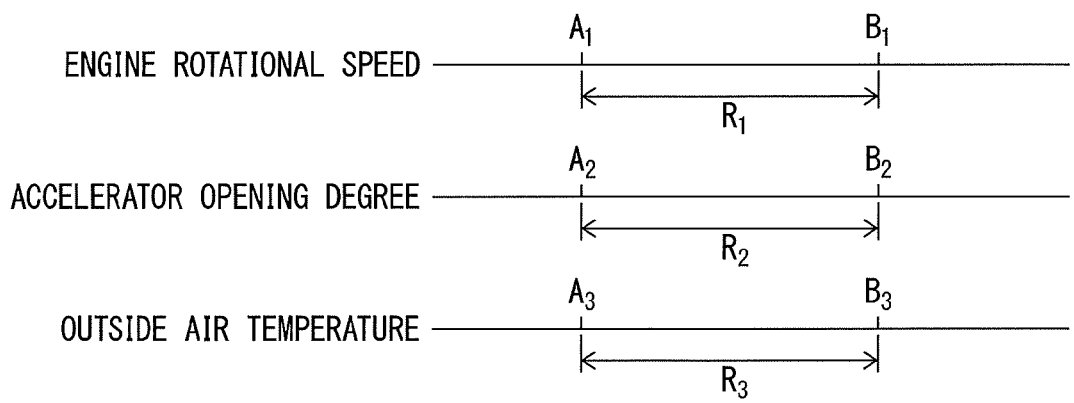
FIG. 13A and FIG. 13B are views showing preset ranges of engine speed etc.

On the other hand, in FIG. 13A, $A_1$ to $B_1$, that is, $R_1$, shows the preset range of the engine speed, $A_2$ to $B_2$, that is, $R_2$, shows the preset range of the accelerator opening degree, and $A_3$ to $B_3$, that is, $R_3$, shows the preset range of the outside air temperature. Note that, in FIG. 13B as well, in the same way as FIG. 13A, $A_1$ to $B_1$ shows the preset range of the engine speed, $A_2$ to $B_2$ shows the preset range of the accelerator opening degree, and $A_3$ to $B_3$ shows the preset range of the outside air temperature. Note that, in this second embodiment, the accelerator opening degree is detected by the load sensor 41, while the outside air temperature is detected by the atmospheric temperature sensor 24. Further, in this second embodiment, for example, the output torque of the engine is actually measured by a torque sensor attached to the engine crankshaft. The torque obtained by this actual measurement is made the training data.

In this second embodiment as well, the engine output torques actually measured for the various input values $x_n$ (n=1, 2, 3) in the preset ranges Rn are found in advance as training data. From these input value data and training data, the structure of the neural network is determined. The weight of the neural network is learned in advance so that the difference between the output value "y" and the training data corresponding to the input values $x_n$ becomes smaller. In this second embodiment as well, the weight of the neural network when using a neural network of the same structure as the neural network used in previous learning and finished being learned is used for further learning onboard during vehicle operation. FIG. 11 shows the learning processing routine of the second embodiment performed onboard. This learning processing routine is executed by interruption every fixed time period, for example, every second.

Referring to FIG. 11, first, at step 201, the learned weight stored in the storage part of the electronic control unit 30, the training data used in the advance learning, and values An and Bn (n=1, 2, 3) showing the ranges of the input data (FIG. 13A) are read. This learned weight is used as the initial value of the weight. Next, at step 202, the number of nodes K of the hidden layer one layer before the output layer of the neural network used in previous learning is read. Next, the routine proceeds to step 203 where a new input value "x", that is, new data, is acquired, then this new input value "x", that is, new data, is stored in the storage part of the electronic control unit 30. Furthermore, at step 203, the actually measured value of the engine output torque corresponding to the new input value "x" is stored as training data in the storage part of the electronic control unit 30.

Next, at step 204, it is judged whether a new input value $x_n$ is in a preset range Rn (between An and Bn) of the input data, that is, whether the new input value $x_n$ is An or more and Bn or less. When the new input value $x_n$ is in the preset range Rn of the input data, the routine proceeds to step 205 where the input value $x_n$ is input to the corresponding node of the input layer of the neural network. Based on the output value "y" output from the node of the output layer of the neural network and the training data, using the error back-propagation algorithm, the weight of the neural network is learned so that the difference between the output value "y" and the training data becomes smaller.

Figure 13B:
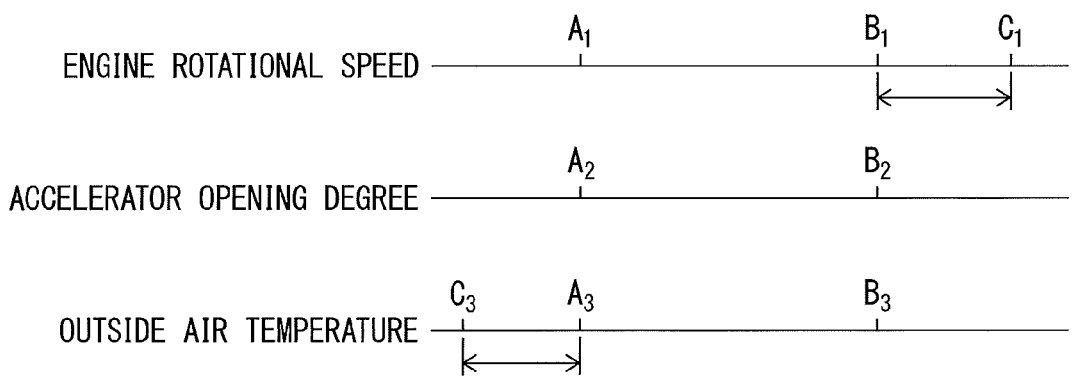

On the other hand, when at step 204 it is judged that the new input value $x_n$ is not in the preset range Rn (between An and Bn) of the input data, for example, when in FIG. 13B the input value $x_1$ showing the engine speed is in the range from $B_1$ to $C_1$ ($B_1<C_1$) ($B_1$ to $C_1$) or when in FIG. 13B the input value $x_3$ showing the outside air temperature is in the range from $C_3$ to $A_3$ ($C_3<A_3$) ($C_3$ to $A_3$), the routine proceeds to step 206. At step 206, it is judged if the input data density D in the range of the new input value $x_n$ ($B_n$ to $C_n$) or the range ($C_n$ to $A_n$) (=number of input data/($C_n$–$B_n$) or number of input data/($A_n$–$C_n$)) has become higher than a predetermined data density $D_0$. If the input data density D is lower than the predetermined data density $D_0$, the processing cycle is ended.

On the other hand, when at step 206 it is judged that the input data density D has become higher than the predetermined data density $D_0$, the routine proceeds to step 207. In this case, when D (=number of input data/($A_n$–$C_n$))>$D_0$, the number α of additional nodes is calculated by the following formula:

Number α of additional nodes=round{(K/(Bn–An))·(An–Cn)}

On the other hand, when D (=number of input data/($C_n$–$B_n$))>$D_0$, the number α of additional nodes is calculated by the following formula:

Number α of additional nodes=round{(K/(Bn–An))·(Cn–Bn)}

Note that, in the above formulas, "K" shows the number of nodes, while "round" means to round off.

As explained above, the routine proceeds from step 206 to step 207 when the input data density D reaches the predetermined data density $D_0$. Therefore, the value of ($A_n$–$C_n$) and the value of ($C_n$–$B_n$) used for calculation of the number α of additional nodes at step 207 become proportional to the number of input data. Therefore, as will be understood from the above formulas, the number α of additional nodes becomes proportional to the number of input data in the range ($B_n$ to $C_n$) or range ($C_n$ to $A_n$) of the new input value $x_n$.

If the number α of additional nodes is calculated at step 207, the routine proceeds to step 208 where the number of nodes K of the hidden layer one layer before the output layer of the neural network is updated and the number of nodes K of the hidden layer one layer before the output layer is made to increase by exactly the number α of additional nodes (K←K+α). Next, at step 209, the neural network is updated so as to make the number of nodes K of the hidden layer one layer before the output layer increase, then the routine proceeds to step 205. At step 205, the training data newly obtained for the new input value "x" is also included in the training data and the weight of the updated neural network is learned so that the difference between the output value "y" and the training data becomes smaller.

Now then, in the second embodiment of the present invention, values An and Bn showing the preset ranges Rn corresponding to the values of the operating parameters of the engine are stored in advance in the ROM 32, that is, in the above-mentioned storage part. Further, the learned weights and training data used in previous learning are stored in the RAM 33, that is, in the above-mentioned storage part.

That is, in the second embodiment according to the present invention, the ranges of the values of the operating parameters of the engine are preset and the numbers of the neural networks and the numbers of the nodes of the hidden layers of the neural networks corresponding to the ranges of the values of the operating parameters of the engine are preset. Training data obtained by actual measurement with respect to the values of the operating parameters of the engine in the preset ranges are stored in the storage part. When the value of an operating parameter of the engine newly acquired by the parameter value acquiring part is inside the preset range, the training data stored in the storage part is used by the processing part to learn the weight of the neural network so that the difference between the output value changing corresponding to the value of that operating parameter of the engine and the training data corresponding to the value of that operating parameter of the engine becomes smaller. When the value of an operating parameter of the engine newly acquired by the parameter value acquiring part is outside the preset range, the number of nodes of the hidden layer one layer before the output layer of the neural network is increased corresponding to the data density of the training data obtained by actual measurement with respect to the newly acquired value of that operating parameter of the engine and the training data obtained by actual measurement with respect to the newly acquired value of the operating parameter of the engine is used by the processing part to learn the weight of the neural network so that the difference between the output value changing corresponding to the value of that operating parameter of the engine and the training data corresponding to the value of that operating parameter of the engine becomes smaller. The neural network with the learned weight is used to output an output value corresponding to the values of the operating parameters of the engine.

In this case, in this second embodiment, as explained above, when the input data density D in the range ($B_n$ to $C_n$) or the range ($C_n$ to $A_n$) of a new input value $x_n$ is higher than a predetermined data density $D_0$, the number of nodes of the hidden layer one layer before the output layer of the neural network is made to increase. That is, in this second embodiment, when the value of an operating parameter of the engine newly acquired by the parameter value acquiring part is outside the preset range, if the data density of the training data obtained by actual measurement with respect to the newly acquired value of the operating parameter of the engine is higher than the preset density, the number of nodes of the hidden layer of the neural network one layer before the output layer is made to increase and the training data stored in the storage part and the training data obtained by actual measurement with respect to the newly acquired value of that operating parameter of the engine are used by the processing part to learn the weight of the neural network so that the difference between the output value changing corresponding to the value of that operating parameter of the engine and the training data corresponding to the value of that operating parameter of the engine becomes smaller.

Further, in this second embodiment, as explained above, the number α of additional nodes is proportional to the number of input data in the range ($B_n$ to $C_n$) or the range ($C_n$ to $A_n$) in which the new input value $x_n$ falls, therefore, the greater the number of input data in the range ($B_n$ to $C_n$) or the range ($C_n$ to $A_n$) in which the new input value $x_n$ falls, the more the number of nodes of the hidden layer of the neural network is increased. That is, in this second embodiment, the greater the number of newly obtained values of an operating parameter of the engine in a range in which the newly acquired values of the operating parameter of the engine fall, the more the number of nodes of the hidden layer one layer before the output layer of the neural network is increased.

Figure 14:
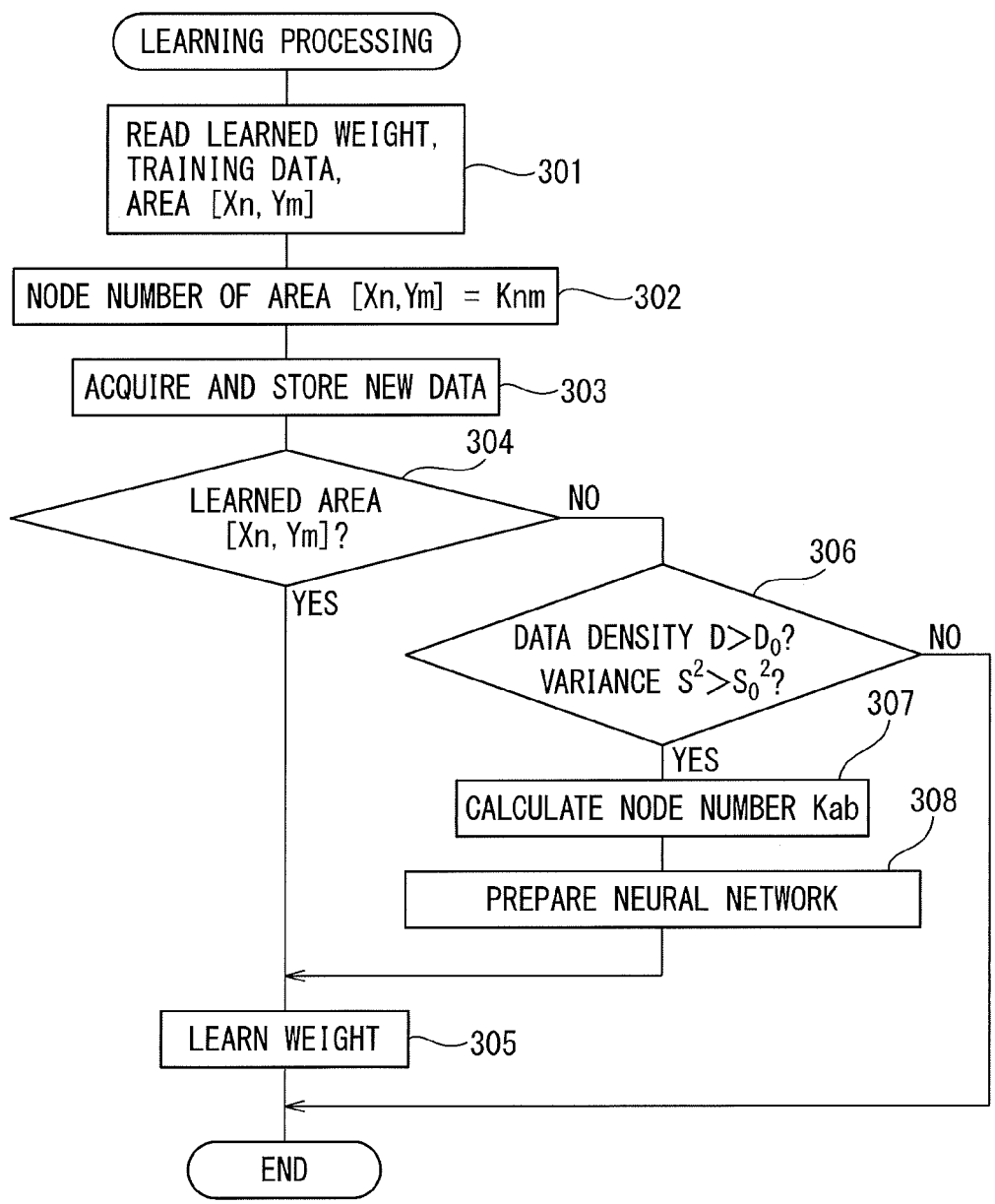
FIG. 14 is a flow chart showing still another embodiment for performing learning processing.
Figure 15:
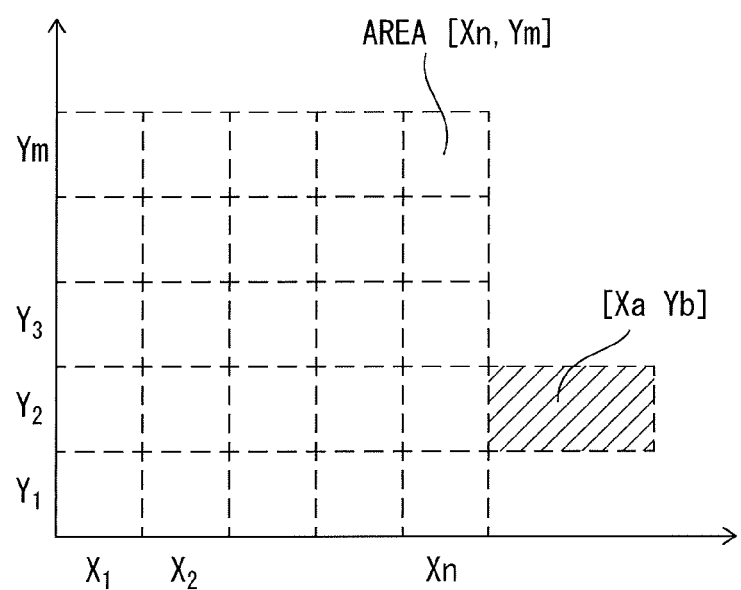
FIG. 15 is a view showing learned areas divided according to values of the operating parameters of the engine.

FIG. 14 and FIG. 15 show a third embodiment according to the present invention. In this third embodiment as well, the operating parameters of the engine are comprised of a plurality of operating parameters. The weight of a neural network is learned based on the plurality of operating parameters. In this third embodiment, as shown in FIG. 15, the ranges by which training data was acquired in advance corresponding to the operating parameters are divided into a plurality of areas [Xn, Ym] (n=1, 2 . . . n, m=1, 2 . . . m). Note that, in FIG. 15, $X_1$, $X_2$ . . . Xn and $Y_1$, $Y_2$ . . . Ym respectively show divided ranges of values of separate operating parameters. Further, in this third embodiment, as a specific example, the case is shown where the operating parameters of the engine are comprised of the engine speed and the outside air temperature and where a neural network model is constructed for estimating the amount of HC emission from the engine based on the values of these operating parameters of the engine. In this case, $X_1$, $X_2$ . . . Xn, for example, show the engine speed divided into 1000 rpm sections (1000 rpm≤$X_1$<200 rpm, 2000 rpm≤$X_2$<3000 rpm . . . ), while $Y_1$, $Y_2$ . . . Ym, for example, show the outside air temperature divided into 10° C. sections (−30° C.≤$Y_1$<−20° C., −20° C.≤$Y_2$<−10° C. . . . )

In this third embodiment, an independent neural network is used for each area [Xn, Ym]. In each of these neural networks, the input layer (L=1) is comprised of two nodes. At each node of the input layer (L=1), an input value $x_1$ showing the engine speed and an input value $x_2$ showing the outside air temperature are input. Further, the number of the hidden layers (L=2 and L=3) may be made one or any other number. The numbers of the nodes of the hidden layers (L=2 and L=3) can also be made any numbers. Note that, in each neural network, the number of nodes of the output layer (L=4) is made one node.

In this third embodiment, the number of nodes of one hidden layer (L=3) differs for each neural network. Below, the number of nodes of the hidden layer one layer before the output layer of the neural network in the area [Xn, Ym] will be indicated by "Knm". This number Knm of nodes of the hidden layer is set in advance in accordance with the complexity of change of the training data corresponding to the change of the input values in the area [Xn, Ym]. Note that, in this third embodiment, instead of the $NO_X$ sensor 23 shown in FIG. 1, an HC sensor is arranged in the exhaust passage. In this third embodiment, the amount of HC emission from the engine is actually measured by this HC sensor, and the amount of HC emission obtained by this actual measurement is made the training data.

In this third embodiment, the amounts of HC emission actually measured with respect to the various input values $x_1$, $x_2$ in the areas [Xn, Ym] (n=1, 2 . . . n, m=1, 2 . . . m) are found in advance as training data. From these input value data and training data, the structure of each neural network corresponding to an area [Xn, Ym], including also the number Knm of nodes of the hidden layers, is determined. The weight of the neural network of an area [Xn, Ym] is learned in advance so that the difference between the output value "y" and the training data corresponding to the input values $x_1$, $x_2$ becomes smaller. Therefore, in this third embodiment, the areas [Xn, Ym] (n=1, 2 . . . n, m=1, 2 . . . m) learned in advance will be referred to below as "learned areas [Xn, Ym]". Note that, in this third embodiment as well, for each of the areas [Xn, Ym], a neural network of the same structure as the neural network used in the previous learning is used and the weight of the neural network when learning has been completed is used for further learning onboard during vehicle operation. FIG. 14 shows the learning processing routine of the third embodiment performed onboard. This learning processing routine is executed by interruption every fixed time period, for example, every second.

Referring to FIG. 14, first, at step 301, the learned weight stored in the storage part of the electronic control unit 30, the training data used in the previous learning, and learned areas [Xn, Ym] (n=1, 2 . . . n, m=1, 2 . . . m) are read. This learned weight is used as the initial value of the weight. Next, at step 302, the number of nodes Knm of the hidden layer one layer before the output layer which had been used in the previous learning for the learned area [Xn, Ym] is read. Next, the routine proceeds to step 303 where new input values $x_1$, $x_2$, that is, new data, are acquired. The new input values $x_1$, $x_2$, that is, new data, are stored in the storage part of the electronic control unit 30. Furthermore, at step 303, the actually measured values of the amounts of HC emission for the new input values $x_1$, $x_2$ are stored as training data in the storage part of the electronic control unit 30.

Next, at step 304, it is judged if the new input values $x_1$, $x_2$ are in the learned areas [Xn, Ym]. When the new input values $x_1$, $x_2$ are in the learned areas [Xn, Ym], the routine proceeds to step 305 where the input values $x_1$, $x_2$ are input to the nodes of the input layer of the neural network of the learned areas [Xn, Ym] in which the input values $x_1$, $x_2$ fall. Based on the output value "y" output from the node of the output layer of the neural network and the training data, using the error backpropagation algorithm, the weight of the neural network of the learned area [Xn, Ym] of the input values $x_1$, $x_2$ is further learned so that the difference between the output value "y" and the training data becomes smaller.

On the other hand, when at step 304 it is judged that the new input values $x_1$, $x_2$ are not inside the learned areas [Xn, Ym], for example, when in FIG. 15 the input values $x_1$, $x_2$ are inside a not learned new area [Xa, Yb], the routine proceeds to step 306. At step 306, it is judged if the input data density D (=number of input data/[Xa, Yb]) in the new area [Xa, Yb] of the new input values $x_1$, $x_2$ has become higher than a predetermined data density $D_0$ and if a variance $S^2$ of input data in the new area [Xa, Yb] of the new input values $x_1$, $x_2$ is larger than a predetermined variance $S^2_0$. If the input data density D is lower than the predetermined data density $D_0$ or if the variance $S^2$ of the input data is smaller than the predetermined variance $S^2_0$, the processing cycle is completed.

On the other hand, when at step 306 the input data density D is higher than the predetermined data density $D_0$ and the variance $S^2$ of the input data is larger than the predetermined variance $S^2_0$, the routine proceeds to step 307. At step 307, based on the following formula for calculation of the number of nodes, the number Kab of nodes corresponding to the new area [Xa, Yb] is calculated from the mean value of the numbers Knm of nodes at the learned areas [Xn, Ym] around the new area [Xa, Yb]:

Number $Kab$ of nodes=$1/N\Sigma\Sigma Kij$ ($i$=($a$−1) to ($a$+1), $j$=($b$−1) to ($b$+1))

Note that, in the above formula, N shows the number of learned areas [Xn, Ym] present around the new area [Xa, Yb]. In this case, if, among the areas [Xn, Ym] around the new area [Xa, Yb], there is a still not used area [Xn, Ym], that is, an area [Xn, Ym] with no number Knm of nodes, that area [Xn, Ym] is excluded from calculation of the number N. For example, explaining this by the example shown in FIG. 15, the mean value of the number of nodes $Kn_1$ of the learned area [Xn, $Y_1$], the number of nodes $Kn_2$ of the learned area [Xn, $Y_2$], and the number of nodes $Kn_3$ of the learned area [Xn, $Y_3$] around the new area [Xa, Yb] is made the number of nodes Kab corresponding to the new area [Xa, Yb].

In this regard, if the relationship of the change of training data corresponding to a change of an input value in each area [Xn, Ym] is simple, it is possible to sufficiently perform learning even if the number of nodes Knm of the hidden layer is reduced, but if the relationship of the change of the training data corresponding to a change in an input value in each area [Xn, Ym] is complicated, it is not possible to sufficiently perform learning unless increasing the number of nodes Knm of the hidden layer. Therefore, as explained above, the number of nodes Knm of a hidden layer of a neural network at a learned area [Xn, Ym] is set corresponding to the complexity of the change of the training data corresponding to a change in an input value in each area [Xn, Ym]. In this regard, when two areas [Xn, Ym] are close, the relationships of the change of training data corresponding to a change of an input value are similar between these areas [Xn, Ym]. Therefore, when the two areas [Xn, Ym] are close, it is possible to use the same number as the number of nodes Knm of the hidden layer. Therefore, in this third embodiment, the mean value of the numbers of nodes Knm at the learned areas [Xn, Ym] around the new area [Xa, Yb] is made the number of nodes Kab corresponding to the new area [Xa, Yb].

Here, as a modification of the third embodiment, a method taking into consideration the number of input data at the new area [Xa, Yb] to find the number of nodes Kab of the new area [Xa, Yb] will be simply explained. That is, if the number of input data in the new area [Xa, Yb], that is, the number of training data, is greater than the numbers of training data in learned areas [Xn, Ym] around the new area [Xa, Yb], the number of nodes Kab corresponding to the new area [Xa, Yb] is preferably made larger than the numbers of nodes Knm at the learned areas [Xn, Ym] around the new area [Xa, Yb]. Therefore, in this modification, the mean value MD of the numbers of training data at the learned areas [Xn, Ym] around the new area [Xa, Yb] is found and the number of input data Mn in the new area [Xa, Yb] is divided by the mean value MD to find the rate of increase of number of nodes RK (=MN/MD). The number of nodes Kab corresponding to the new area [Xa, Yb] found from the above formula for calculation of number of nodes is multiplied with this rate of increase of number of nodes RK to obtain the final number of nodes Kab corresponding to the new area [Xa, Yb].

If at step 307 the number of nodes Kab corresponding to the new area [Xa, Yb] is calculated, the routine proceeds to step 308 where a new neural network is prepared corresponding to the new area [Xa, Yb]. In this new neural network, the number of nodes is made two nodes for the input layer, the number of nodes is made Kab number for the hidden layer one layer before the output layer, and the number of nodes is made one for the output layer. Next, the routine proceeds to step 305. At step 305, the weight of the neural network prepared corresponding to the new area [Xa, Yb] is learned so that in the new area [Xa, Yb], the difference between the output value "y" and training data becomes smaller.

That is, in the third embodiment according to the present invention, when the value of an operating parameter of the engine newly acquired by the parameter value acquiring part is outside the preset range, if the data density of the training data obtained by actual measurement with respect to the newly acquired value of the operating parameter of the engine is higher than a preset density, the number of nodes of the hidden layer one layer before the output layer of the neural network is increased by preparing a new neural network and the training data obtained by actual measurement with respect to the newly acquired value of the operating parameter of the engine is used by the processing part to learn the weight of the new neural network so that the difference between the output value changing according to the value of the operating parameter of the engine and the training data corresponding to the value of the operating parameter of the engine becomes smaller.

Explained a bit more specifically, in the third embodiment according to the present invention, the operating parameters of the engine are comprised of a plurality of different engine operating parameters. Learned areas in the preset ranges of values of the different engine operating parameters divided corresponding to the values of the engine operating parameters and finished being learned are set in advance. A neural network is prepared for each learned area. When the value of an operating parameter of the engine newly acquired by the parameter value acquiring part is inside a new area outside the preset range and not finished being learned, if the data density in the new area of the training data obtained by actual measurement with respect to the newly acquired value of that operating parameter of the engine is higher than the preset density, a new neural network is prepared for the new area. The training data obtained by actual measurement with respect to the newly acquired value of the operating parameter of the engine is used by the processing part to learn the weight of the new neural network prepared for the new area so that the difference between the output value changing according to the value of the operating parameter of the engine and the training data corresponding to the value of the operating parameter of the engine becomes smaller.

In this case, in this third embodiment, as explained above, the number of nodes of the hidden layer one layer before the output layer of the new neural network prepared corresponding to the new area is set from the mean value of the number of nodes of the hidden layer one layer before the output layer of the neural networks prepared corresponding to the learned areas positioned around the new area. Further, in this case, the larger the number of input data corresponding to the new area, the more the number of nodes of the hidden layer one layer before the output layer of the new neural network prepared corresponding to the new area is increased.

Next, referring to FIG. 16A to FIG. 17B, a specific example of the case of applying the present invention to a special internal combustion engine for low load use will be explained. In this specific example, a neural network with a hidden layer (L=3) having four nodes as shown in FIG. 12 is used to prepare a model for outputting an output value "y" showing the exhaust amount of $NO_X$ from the opening degree of the throttle valve 12, engine speed, and ignition timing. Note that, in the internal combustion engine used in this specific example, the usable range of the opening degree of the throttle valve 12 is set from 5.5° to 11.5° (opening degree of throttle valve 12 at maximum closed position being deemed 0°), the usable range of the engine speed is set from 1600 (rpm) to 3000 (rpm), and the usable range of the ignition timing is set from 0° (compression top dead center) to ATDC (after compression top dead center) 40°.

Figure 16A:
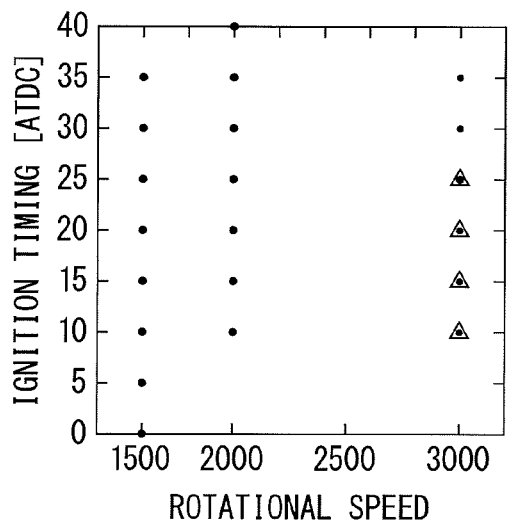
FIG. 16A, FIG. 16B, and FIG. 16C respectively are views showing the distribution of training data with respect to the engine speed and the ignition timing, the distribution of training data with respect to the ignition timing and the throttle opening degree, and the relationships of the training data and the output values after learning.
Figure 16B:
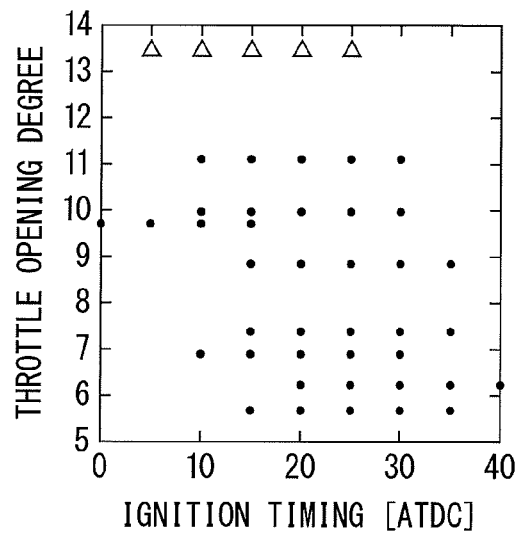

FIG. 16A shows the distribution of training data with respect to the ignition timing and engine speed, while FIG. 16B shows the distribution of training data with respect to the throttle valve opening degree and the ignition timing. Note that, in FIG. 16A and FIG. 16B, the black circles show the locations of existence of the training data acquired in advance, while the triangle marks show the locations where training data is not obtained in advance. From FIG. 16A and FIG. 16B, the throttle valve opening degrees, the engine speeds, and the ignition timings for which training data is acquired in advance can be confirmed. For example, it will be understood that in FIG. 16A, the training data is acquired in advance when the engine speed N is 2000 (rpm) and the ignition timing is ATDC20°, while as shown in FIG. 16B, the training data is acquired in advance corresponding to various throttle valve opening degrees when the ignition timing is ATDC20°.

Figure 16C:
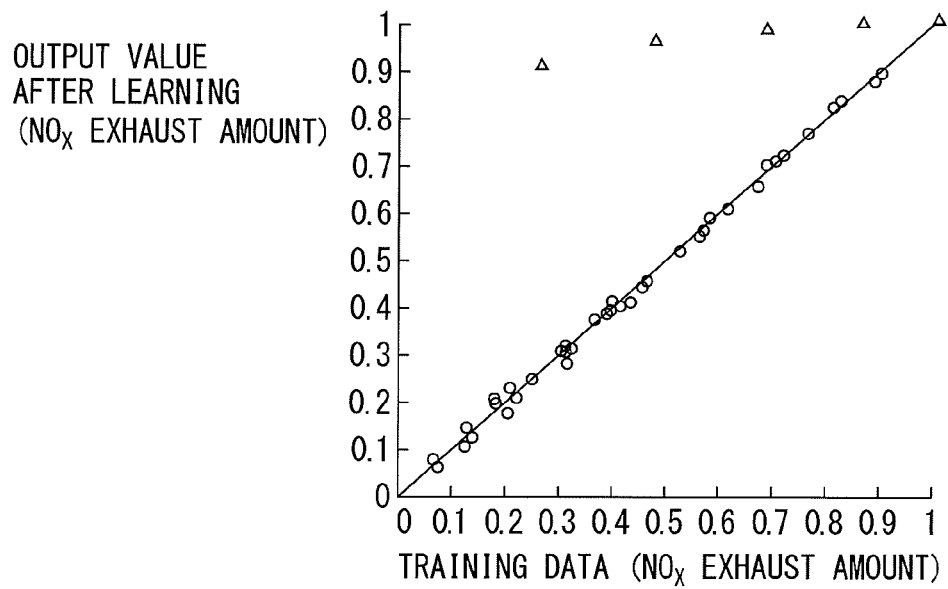
Figure 17A:
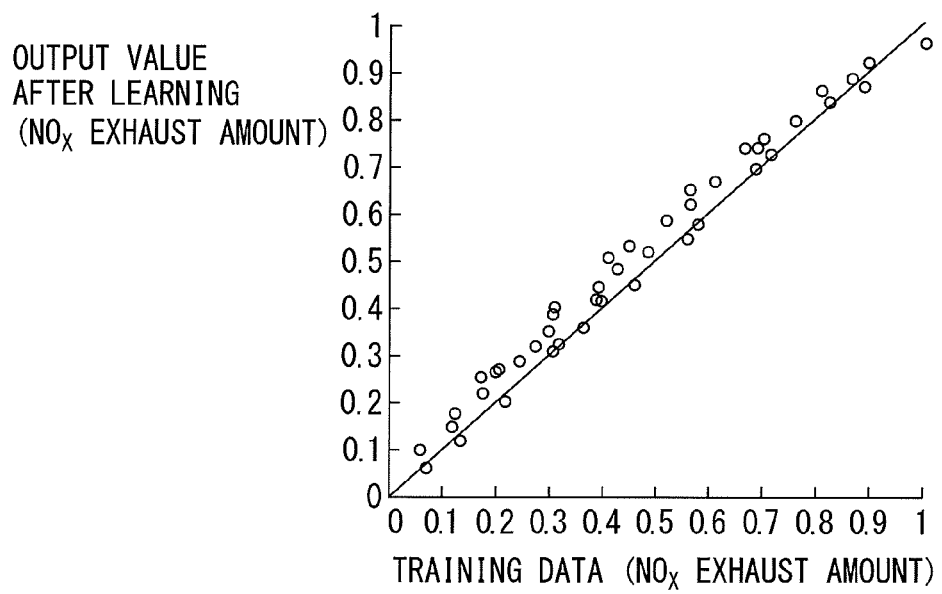
FIG. 17A and FIG. 17B are views showing the relationships between the training data and the output values after learning.
Figure 17B:
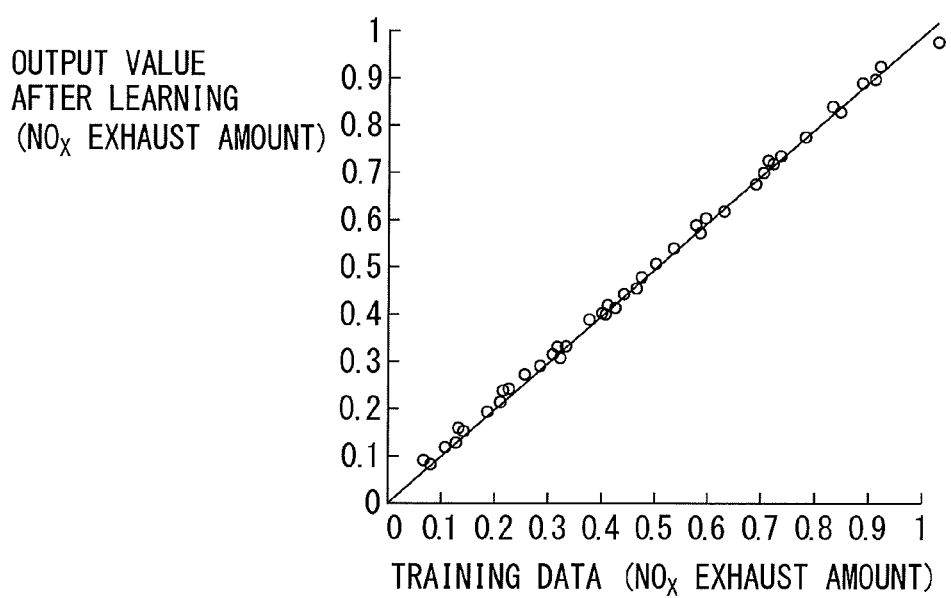

On the other hand, in this specific example, the throttle valve opening degree, engine speed, and ignition timing are input to the nodes of the input layer (L=1) of the neural network and the weight of the neural network is learned so that the difference between the output value "y" and the training data showing the amount of $NO_X$ emission detected by the $NO_X$ sensor 23 becomes smaller. The relationship between the learned output value "y" and the training data is shown in FIG. 16C, FIG. 17A, and FIG. 17B. Note that, in FIG. 16C, FIG. 17A, and FIG. 17B, the values of the learned output value "y" and training data are shown normalized so that their maximum values become 1.

Now then, as explained above, in the internal combustion engine used in this specific example, the usable range of the opening degree of the throttle valve 12 is set from 5.5° to 11.5°, the usable range of the engine speed N is set from 1600 (rpm) to 3000 (rpm), and the usable range of the ignition timing is set from 0° (compression top dead center) to ATDC40°. The circle marks in FIG. 16C show the relationship between the learned output value "y" and the training data in case where the amount of $NO_X$ emission when the throttle valve opening degree, engine speed N, and ignition timing are used in these usable ranges is acquired as training data in advance and the weight of the neural network is learned so that the output value "y" matches the previously acquired training data.

As shown in FIG. 16C, the circle marks showing the relationship between the learned output value "y" and the training data cluster about a single straight line. Therefore, it will be understood that the learned output value "y" is made to match the training data. In this regard, for example, if mentioning the opening degree of the throttle valve 12 as an example, the opening degree of the throttle valve 12 will sometimes end up deviating from the proper opening degree due to individual differences in engines and aging. Even if the usable range of the opening degree of the throttle valve 12 were set to from 5.5° to 11.5°, in actuality the opening degree of the throttle valve 12 would sometimes end up exceeding the preset usable range. The triangle marks shown in FIG. 16A and FIG. 16B show the locations of training data newly acquired when the opening degree of the throttle valve 12 exceeds the preset usable range and ends up becoming 13.5°.

The triangle marks of FIG. 16C show the case of not using the training data newly acquired when the opening degree of the throttle valve 12 exceeds a preset usable range and ends up becoming 13.5°, but just using the training data acquired previously to learn the weight of the neural network. In this case, it will be understood that the estimated value of the exhaust amount of $NO_X$ when the opening degree of the throttle valve 12 exceeds a preset usable range and ends up becoming 13.5° ends up greatly deviating from the actually measured value. On the other hand, the circle marks in FIG. 17A show the case of using both training data of the new training data acquired when the opening degree of the throttle valve 12 exceeds a preset usable range and ends up becoming 13.5° and the training data acquired previously to learn the weight of the neural network. In this case, it will be understood that the estimated value of the amount of $NO_X$ exhaust ends up deviating from the actually measured value overall.

As opposed to this, the circle marks in FIG. 17B, in the same way as FIG. 17A, show the case of using both training data of the new training data acquired when the opening degree of the throttle valve 12 exceeds a preset usable range and ends up becoming 13.5° and the training data acquired previously and, unlike in FIG. 17A, increasing the number of nodes of the hidden layer (L=3) of the neural network from four to seven, then learning the weight of the neural network. In this case, it will be understood that the estimated value of the amount of $NO_X$ emission matches the actually measured value with a good precision. When in this way the newly acquired value of an operating parameter of the engine is outside the preset range, it is possible to raise the precision of estimation by making the number of nodes of the hidden layer one layer before the output layer of the neural network increase.

The invention claimed is:

1. A control device of an internal combustion engine having an electronic control unit, said electronic control unit comprises:

an interface configured to acquire values of operating parameters of the engine, a memory configured to store:
    a neural network comprised of an input layer, hidden layers, and an output layer; and
    training data obtained by actually measuring values of the operating parameters of the engine in preset ranges, wherein the preset ranges of the values of the operating parameters of the engine are set in advance and a number of nodes of the hidden layers of the neural network corresponding to the preset ranges of values of the operating parameters of the engine are set in advance, and a processor configured to:

input the values of the operating parameters of the engine to the input layer;

when a newly acquired value of an operating parameter of the engine is inside a preset range, use the stored training data to learn a weight of the neural network so that a difference between an output value changing according to the newly acquired value of the operating parameter of the engine and the training data corresponding to the newly acquired value of the operating parameter of the engine becomes smaller;

when the newly acquired value of the operating parameter of the engine is outside the preset range:
    increase a number of nodes of a hidden layer one layer before the output layer of the neural network to corresponding to a number or data density of training data obtained by actual measurement with respect to the newly acquired value of the operating parameter of the engine, and
    use the training data obtained by actual measurement with respect to the newly acquired value of the operating parameter of the engine to learn the weight of the neural network so that the difference between the output value changing according to the newly acquired value of the operating parameter of the engine and the training data corresponding to the newly acquired value of the operating parameter of the engine becomes smaller; and output an output value corresponding to the value of the operating parameter of the engine using the neural network with the learned weight.

2. The control device of an internal combustion engine according to claim 1, wherein the processor is configured to, when the newly acquired value of the operating parameter of the engine is outside the preset range;

increase the number of nodes of the hidden layer one layer before the output layer, and use the stored training data and the training data obtained by actual measurement corresponding to the newly acquired value of the operating parameter of the engine to learn the weight of the neural network so that the difference between the output value changing according to the newly acquired value of the operating parameter of the engine and the training data corresponding to the newly acquired value of the operating parameter of the engine becomes smaller.

3. The control device of an internal combustion engine according to claim 1, wherein the processor is configured to, when the newly acquired value of the operating parameter of the engine is outside the preset range and the data density of the training data obtained by actual measurement with respect to the newly acquired value of the operating parameter of the engine is higher than a preset density;

increase the number of nodes of the hidden layer one layer before the output layer of the neural network, and use the stored training data and the training data obtained by actual measurement with respect to the newly acquired value of the operating parameter of the engine to learn the weight of the neural network so that the difference between the output value changing according to the newly acquired value of the operating parameter of the engine and the training data corresponding to the newly acquired value of the operating parameter of the engine becomes smaller.

4. The control device of an internal combustion engine according to claim 3, wherein the processor is configured to increase the number of nodes of the hidden layer one layer before the output layer of the neural network such that the greater a number of newly acquired values of the operating parameter of the engine falling in a range, the more the number of nodes of the hidden layer one layer before the output layer of the neural network is increased.

5. The control device of an internal combustion engine according to claim 1, wherein the processor is configured to, when the newly acquired value of the operating parameter of the engine is outside the preset range and the data density of the training data obtained by actual measurement with respect to the newly acquired value of the operating parameter of the engine is higher than a preset density;

increase the number of nodes of the hidden layer one layer before the output layer of the neural network by preparing a new neural network, and use the training data obtained by actual measurement with respect to the newly acquired value of the operating parameter of the engine to learn a weight of the new neural network so that the difference between the output value changing according to the newly acquired value of the operating parameter of the engine and the training data corresponding to the newly acquired value of the operating parameter of the engine becomes smaller.

6. The control device of an internal combustion engine according to claim 5, wherein the operating parameters of the engine include a plurality of different engine operating parameters, the preset ranges include learned areas that are divided corresponding to the values of the engine operating parameters and are finished being learned, a neural network is prepared for each of the learned areas, and the processor is configured to, when the newly acquired value of the operating parameter of the engine is inside a new area that is outside the learned areas and a data density in the new area of the training data obtained by actual measurement with respect to the newly acquired value of the operating parameter of the engine is higher than the preset density:

prepare the new neural network for the new area, and use the training data obtained by actual measurement with respect to the newly acquired value of the operating parameter of the engine to learn a weight of the new neural network prepared for the new area so that the difference between the output value changing according to the newly acquired value of the operating parameter of the engine and the training data corresponding to the newly acquired value of the operating parameter of the engine becomes smaller.

7. The control device of an internal combustion engine according to claim 6, wherein the processor is configured to set the number of nodes of the hidden layer one layer before the output layer of the new neural network prepared for the new area based on a mean value of numbers of nodes of hidden layers of the neural networks prepared for the learned areas that are positioned around the new area.

8. The control device of an internal combustion engine according to claim 7, wherein the processor is configured to increase the number of nodes of the hidden layer one layer before the output layer such that the greater a number of input data corresponding to the new area, the more the number of nodes of the hidden layer one layer before the output layer of the new neural network prepared for the new area is increased.

9. A control device of an internal combustion engine using a neural network, wherein preset ranges of values of operating parameters of the engine are set in advance and a number of nodes of hidden layers of the neural network corresponding to the preset ranges of the values of the operating parameters of the engine are set in advance, the control device comprising:
an electronic control unit configured to, when a newly acquired value of an operating parameter of the engine is outside a preset range, increase a number of nodes of a hidden layer one layer before an output layer of the neural network.

10. A control device of an internal combustion engine using a neural network, wherein preset ranges of values of operating parameters of the engine are set in advance and a number of nodes of hidden layers of the neural network corresponding to the preset ranges of the values of the operating parameters of the engine are set in advance, the control device comprising:
an electronic control unit configured to:
when a newly acquired value of an operating parameter of the engine is outside a preset range:
increase a number of nodes of a hidden layer one layer before an output layer of the neural network corresponding to a number or data density of training data obtained by actual measurement with respect to the newly acquired value of the operating parameter of the engine, and
use the training data obtained by actual measurement with respect to the newly acquired value of the operating parameter of the engine to learn a weight of the neural network so that a difference between an output value changing according to the newly acquired value of the operating parameter of the engine and the training data corresponding to the newly acquired value of the operating parameter of the engine becomes smaller, and
output an output value corresponding to the value of the operating parameter of the engine using the neural network with the learned weight.

11. A control device of an internal combustion engine using a neural network, wherein preset ranges of values of operating parameters of the engine are set in advance, a number of nodes of hidden layers of the neural network corresponding to the preset ranges of the values of the operating parameters of the engine are set in advance, and training data obtained by actually measuring values of the operating parameters of the engine in the preset ranges is stored, the control device comprising:
an electronic control unit configured to:
when a newly acquired value of an operating parameter of the engine is inside a preset range, use the stored training data to learn a weight of the neural network so that a difference between an output value changing according to the newly acquired value of the operating parameter of the engine and the training data corresponding to the newly acquired value of the operating parameter of the engine becomes smaller,
when the newly acquired value of the operating parameter of the engine is outside the preset range:
increase a number of nodes of a hidden layer one layer before an output layer of the neural network corresponding to a number or data density of training data obtained by actual measurement with respect to the newly acquired value of the operating parameter of the engine, and
use the training data obtained by actual measurement corresponding to the newly acquired value of the operating parameter of the engine to learn the weight of the neural network so that the difference between the output value changing according to the value of the operating parameter of the engine and the training data corresponding to the value of the operating parameter of the engine becomes smaller, and
output value corresponding to the value of the operating parameter of the engine using the neural network with the learned weight.

* * * * *

UNITED STATES PATENT AND TRADEMARK OFFICE
CERTIFICATE OF CORRECTION

PATENT NO. : 10,634,081 B2  
APPLICATION NO. : 15/922151  
DATED : April 28, 2020  
INVENTOR(S) : Eiki Kitagawa et al.

Page 1 of 1

It is certified that error appears in the above-identified patent and that said Letters Patent is hereby corrected as shown below:

On the Title Page

Item (30), the Foreign Application Priority Data is incorrect. Item (30) should read:  
-- (30) Foreign Application Priority Data  
Feb. 5, 2018     (JP)............................... 2018- 018425 --

Signed and Sealed this  
Seventh Day of July, 2020

Andrei Iancu  
*Director of the United States Patent and Trademark Office*